US012190896B2

United States Patent
Li et al.

(10) Patent No.: US 12,190,896 B2
(45) Date of Patent: Jan. 7, 2025

(54) GENERATING AUDIO WAVEFORMS USING ENCODER AND DECODER NEURAL NETWORKS

(71) Applicant: Google LLC, Mountain View, CA (US)

(72) Inventors: Yunpeng Li, Zurich (CH); Marco Tagliasacchi, Kilchberg (CH); Dominik Roblek, Meilen (CH); Félix de Chaumont Quitry, Zurich (CH); Beat Gfeller, Dubendorf (CH); Hannah Raphaelle Muckenhirn, Zurich (CH); Victor Ungureanu, Thalwil (CH); Oleg Rybakov, Redmond, WA (US); Karolis Misiunas, Zurich (CH); Zalán Borsos, Zurich (CH)

(73) Assignee: Google LLC, Mountain View, CA (US)

( * ) Notice: Subject to any disclaimer, the term of this patent is extended or adjusted under 35 U.S.C. 154(b) by 294 days.

(21) Appl. No.: 17/856,292

(22) Filed: Jul. 1, 2022

(65) Prior Publication Data
US 2023/0013370 A1    Jan. 19, 2023

Related U.S. Application Data

(60) Provisional application No. 63/218,141, filed on Jul. 2, 2021.

(51) Int. Cl.
*G10L 19/022* (2013.01)
*G06N 3/045* (2023.01)

(52) U.S. Cl.
CPC .......... *G10L 19/022* (2013.01); *G06N 3/045* (2023.01)

(58) Field of Classification Search
None
See application file for complete search history.

(56) References Cited

U.S. PATENT DOCUMENTS

| | | | |
|---|---|---|---|
| 10,090,001 B2 | 10/2018 | Theverapperuma et al. | |
| 10,977,555 B2* | 4/2021 | Jansson | G06N 3/082 |
| 11,727,926 B1* | 8/2023 | Liu | G10L 21/0208 |
| | | | 704/232 |
| 11,790,926 B2* | 10/2023 | Lee | G10L 19/028 |
| | | | 704/500 |
| 11,854,564 B1* | 12/2023 | Chatlani | G10L 15/16 |

(Continued)

OTHER PUBLICATIONS

Liu, Hung-Ping, Yu Tsao, and Chiou-Shann Fuh. "Bone-conducted speech enhancement using deep denoising autoencoder." Speech Communication 104 (2018): 106-112. (Year: 2018).*

(Continued)

*Primary Examiner* — Douglas Godbold
(74) *Attorney, Agent, or Firm* — Fish & Richardson P.C.

(57) ABSTRACT

Methods, systems, and apparatus, including computer programs encoded on a computer storage medium, for processing an input audio waveform using a generator neural network to generate an output audio waveform. In one aspect, a method comprises: receiving an input audio waveform; processing the input audio waveform using an encoder neural network to generate a set of feature vectors representing the input audio waveform; and processing the set of feature vectors representing the input audio waveform using a decoder neural network to generate an output audio waveform that comprises a respective output audio sample for each of a plurality of output time steps.

47 Claims, 7 Drawing Sheets

(56) References Cited

U.S. PATENT DOCUMENTS

| | | | |
|---|---|---|---|
| 2010/0172519 A1* | 7/2010 | Kimura | H04R 1/1008 |
| | | | 381/151 |
| 2018/0329897 A1* | 11/2018 | Kalchbrenner | G06N 3/047 |
| 2020/0365166 A1* | 11/2020 | Zhang | G06N 3/047 |
| 2021/0117733 A1* | 4/2021 | Mahto | G06N 3/0475 |
| 2021/0193159 A1* | 6/2021 | Pearson | G10L 21/0364 |
| 2021/0366461 A1* | 11/2021 | Ahmed | G10L 15/16 |
| 2022/0270590 A1* | 8/2022 | Beaufays | G06N 3/084 |
| 2022/0277721 A1* | 9/2022 | Zhang | G10L 21/0208 |
| 2022/0343898 A1* | 10/2022 | Fu | G10L 15/16 |
| 2023/0094630 A1* | 3/2023 | Zhang | G06V 10/82 |
| | | | 704/226 |
| 2023/0186937 A1* | 6/2023 | Uhlich | G10L 15/08 |
| | | | 704/251 |
| 2023/0229892 A1* | 7/2023 | Biswas | G06N 3/0455 |
| | | | 704/500 |
| 2023/0274754 A1* | 8/2023 | Ahn | G10L 21/0232 |
| | | | 704/226 |
| 2023/0326476 A1* | 10/2023 | Andreev | G10L 21/038 |
| | | | 704/226 |

OTHER PUBLICATIONS

Gfeller, Beat, Dominik Roblek, and Marco Tagliasacchi. "One-shot conditional audio filtering of arbitrary sounds." ICASSP 2021—2021 IEEE International Conference on Acoustics, Speech and Signal Processing (ICASSP). IEEE, 2021. (Year: 2021).*

Pandey, Ashutosh, and DeLiang Wang. "Densely connected neural network with dilated convolutions for real-time speech enhancement in the time domain." ICASSP 2020—2020 IEEE International Conference on Acoustics, Speech and Signal Processing (ICASSP). IEEE, 2020. (Year: 2020).*

Kaneko, Takuhiro, et al. "Generative adversarial network-based postfilter for statistical parametric speech synthesis." 2017 IEEE international conference on acoustics, speech and signal processing (ICASSP). IEEE, 2017. (Year: 2017).*

Li, Yunpeng, et al. "Real-time speech frequency bandwidth extension." ICASSP 2021—2021 IEEE International Conference on Acoustics, Speech and Signal Processing (ICASSP). IEEE, 2021. (Year: 2021).*

Yu, Cheng, et al. "Time-domain multi-modal bone/air conducted speech enhancement." IEEE Signal Processing Letters 27 (2020): 1035-1039. (Year: 2020).*

[No Author Listed] [online], "anker 01210 3067," May 10, 2020, retrieved on Jan. 23, 2024, <https://www.youtube.com/watch?v=ediYpruLT3Y&list=PLa5CkN3odpnxi3WqMH4MgVk7XUjCP99d3&index=2>, 53 pages [Video Submission].

[No Author Listed] [online], "columbia d14543 bx559," May 10, 2020, retrieved on Jan. 23, 2024, <https://www.youtube.com/watch?v=jaCyLksGQJQ&list=PLa5CkN3odpnxi3WqMH4MgVk7XUjCP99d3&index=3>, 53 pages[Video Submission].

[No Author Listed] [online], "Freddie Meter," Available on or before Nov. 14, 2019, Internet Archive: Wayback Machine URL <https://web.archive.org/web/20190501000000*/https://freddiemeter.withyoutube.com/>, retrieved on Dec. 18, 2023, URL<https://freddiemeter.withyoutube.com/>, 4 pages.

[No Author Listed] [online], "zonophone x28011 10409u," May 10, 2020, retrieved on Jan. 23, 2024, <https://www.youtube.com/watch?v=TPWi2344sEQ&list=PLa5CkN3odpnxi3WqMH4MgVk7XUjCP99d3&index=1>, 45 pages [Video Submission].

[No Author Listed], "Method for the subjective assessment of intermediate quality level of audio systems," ITU-Recommendation BS.1534-3, Oct. 2015, 36 pages.

Abdulatif et el., "AeGAN: Time-Frequency Speech Denoising via Generative Adversarial Networks," CoRR, Submitted on Jun. 6, 2020, arXiv:1910.12620v3, 5 pages.

Abel et al., "Artificial Bandwidth Extension Using Deep Neural Networks for Spectral Envelope Estimation," International Workshop on Acoustic Signal Enhancement (IWAENC) 2016, 2016, 5 pages.

Acero et al., "Environmental Robustness in Automatic Speech Recognition," International Conference on Acoustics, Speech, and Signal Processing, 1990, 4 pages.

Acero, "Acoustical and Environmental Robustness in Automatic Speech Recognition," A Dissertation for the degree of Doctor of Philosophy in Electrical Engineering, Carnegie Mellon University, Department of Electrical and Computer Engineering, Sep. 13, 1990, 153 pages.

Anand et al., "Spearphone: A Speech Privacy Exploit via Accelerometer-Sensed Reverberations from Smartphone Loudspeakers," CoRR, Submitted on Jul. 12, 2019, arXiv:1907.05972v1, 16 pages.

Ariav et al., "An End-to-End Multimodal Voice Activity Detection Using Wavenet Encoder and Residual Networks," IEEE Journal of Selected Topics in Signal Processing, May 2019, 13(2):265-274.

Armanious et al., "MedGAN: Medical Image Translation using GANs," CORR, Submitted on Jun. 17, 2018, arXiv:1806.06397v1, 17 pages.

Attias et al., "Speech Denoising and Dereverberation Using Probabilistic Models," Advances in Neural Information Processing Systems 13, 2001, 7 pages.

Ba et al., "Layer Normalization," CoRR, Submitted on Jul. 21, 2016, arXiv:1607.06450v1, 14 pages.

Bassiou et al., "Greek Folk Music Denoising Under a Symmetric α-Stable Noise Assumption," 2014 10th International Conference on Heterogeneous Networking for Quality, Reliability, Security, and Electronics Engineers, 2014, 7 pages.

Berouti et al., "Enhancement of speech corrupted by acoustic noise," IEEE International Conference on Acoustics, Speech, and Signal Processing (ICASSP), 1979, 4:208-211.

Birnbaum et al., "Temporal FiLM: Capturing Long-Range Sequence Dependencies with Feature-Wise Modulation," 33rd Conference on Neural Information Processing Systems, 2019, 12 pages.

Biswas et al., "Audio Codec Enhancement with Generative Adversarial Networks," CoRR, Submitted on Jan. 27, 2020, arXiv:2001.09653v1, 5 pages.

Blog.google [online], "Song stuck in your head? Just hum to search," Oct. 15, 2020, retrieved on Dec. 18, 2023, retrieved from URL <https://blog.google/products/search/hum-to-search/>, 5 pages.

Blog.research.google [online], "Improving Speech Representations and Personalized Models Using Self-Supervision," Jun. 18, 2020, retrieved on Dec. 8, 2023, retrieved from URL <https://blog.research.google/2020/06/improving-speech-representations-and.html>, 7 pages.

Borsos et al., "MicAugment: One-shot Microphone Style Transfer," CoRR, Submitted on Oct. 19, 2020, arXiv:2010.09658v1, 5 pages.

Clevert et al., "Fast and Accurate Deep Network Learning by Exponential Linear Units (ELUs)," CoRR, Submitted on Feb. 22, 2016, arXiv:1511.07289v5, 14 pages.

Datashare.ed.ac.uk [online], "CSTR VCTK Corpus: English Multi-speaker Corpus for CSTR Voice Cloning Toolkit (version 0.92)," Nov. 13, 2019, retrieved on Dec. 22, 2023, retrieved from URL <https://datashare.ed.ac.uk/handle/10283/3443>, 2 pages (Abstract only).

Datashare.ed.ac.uk [online], "Superseded CSTR VCTK Corpus: English Multi-speaker Corpus for CSTR Voice Cloning Toolkit," Apr. 4, 2017, retrieved on Dec. 22, 2023, retrieved from URL <https://datashare.ed.ac.uk/handle/10283/2651>, 2 pages (Abstract only).

Deng et al., "Exploiting time-frequency patterns with LSTM-RNNs for low-bitrate audio restoration," Neural Computing and Applications, 2020, 32(4):1095-1107.

Distill.pub [online], "Deconvolution and Checkerboard Artifacts," Oct. 17, 2016, retrieved on Dec. 21, 2023, retrieved from URL <https://distill.pub/2016/deconv-checkerboard/>, 10 pages.

Donahue et al., "Exploring speech enhancement with generative adversarial networks for robust speech recognition," IEEE International Conference on Acoustics, Speech and Signal Processing (ICASSP), 2018, pp. 5024-5028.

(56) References Cited

OTHER PUBLICATIONS

Dong et al., "Image Super-Resolution Using Deep Convolutional Networks," CoRR, Submitted on Jul. 31, 2015, arXiv:1501.00092v3, 14 pages.
Engel et al., "DDSP: Differentiable Digital Signal Processing," CoRR, Submitted on Jan. 14, 2020, arXiv:2001.04643v1, 19 pages.
Ephraim et al., "Speech Enhancement Using a Minimum Mean-Square Error Log-Spectral Amplitude Estimator," IEEE Transactions on Acoustics, Speech, and Signal Processing, Apr. 1985, 33(2):443-445.
Ephrat et al., "Looking to Listen at the Cocktail Party: A Speaker-Independent Audio-Visual Model for Speech Separation," ACM Trans. Graph., Aug. 2018, 37(4):1-11.
Eskimez et al., "Adversarial Training for Speech Super-Resolution," IEEE Journal of Selected Topics in Signal Processing, 2019, 13(2):1-12.
Feng et al., "Speech feature denoising and dereverberation via deep autoencoders for noisy reverberant speech recognition," IEEE International Conference on Acoustics, Speech and Signal Processing (ICASSP), May 4, 2014, pp. 1759-1763.
Fevotte et al., "Sparse Linear Regression with Structured Priors and Application to Denoising of Musical Audio," IEEE Transactions on Audio, Speech, and Language Processing, Jan. 2008, 16(1):174-185.
Fonseca et al., "FSD50K: An Open Dataset of Human-Labeled Sound Events," CoRR, Submitted on Oct. 1, 2020, arXiv:2010.00475v1, 24 pages.
Font et al., "Freesound Technical Demo," ACM International Conference on Multimedia (MM'13), Oct. 21-25, 2013, pp. 411-412.
Garofolo et al., "TIMIT Acoustic-phonetic Continuous Speech Corpus," NIST Interagency/Internal Report (NISTIR)—4930, Feb. 1993, 94 pages.
Gemmeke et al., "Audio Set: An ontology and human-labeled dataset for audio events," Proc. IEEE ICASSP, 2017, 5 pages.
Germain et al., "Speech Denoising with Deep Feature Looses," Interspeech 2019, Sep. 15-19, 2019, pp. 2723-2727.
Gfeller et al., "One-shot conditional audio filtering of arbitrary sounds," CoRR, Submitted on Nov. 4, 2020, arXiv:2011.02421v1, 5 pages.
Gfeller et al., "SPICE: Self-supervised Pitch Estimation," CoRR, Submitted on Sep. 4, 2020, arXiv:1910.11664v2, 10 pages.
Github.com [online], "google-research/ seanet," Available on or before Oct. 28, 2020, via Internet Archive: Wayback Machine URL <https://web.archive.org/web/20200615000000*/https://github.com/google-research/seanet>, retrieved on Dec. 18, 2023, URL<https://github.com/google-research/seanet>, 2 pages.
Github.com [online], "Streaming Aware neural network models," Available on or before May 29, 2020, via Internet Archive: Wayback Machine URL <https://web.archive.org/web/20201001000000*/https://github.com/google-research/google-research/tree/master/kws_streaming>, retrieved on Dec. 21, 2023, URL <https://github.com/google-research/google-research/tree/master/kws_streaming>, 24 pages.
Google-research.github.io [online], "Audio samples for "MicAugment: One-shot Microphone Style Transfer"," Available on or before Nov. 1, 2020, via Internet Archive: Wayback Machine URL <https://web.archive.org/web/20200615000000*/https://google-research.github.io/seanet/micaugment/examples/>, retrieved on Dec. 18, 2023, 1 page.
Google-research.github.io [online], "Audio samples for the paper "One-shot conditional audio filtering of arbitrary sounds"," Available on or before Jan. 26, 2021, via Internet Archive: Wayback Machine URL <https://web.archive.org/web/20210615000000*/https://google-research.github.io/seanet/soundfilter/examples/index.html#librispeech>, retrieved on Dec. 22, 2023, URL<https://google-research.github.io/seanet/soundfilter/examples/index.html#librispeech>, 33 pages.
Google-research.github.io [online], "Audio samples from "SEANet: A Multi-modal Speech Enhancement Network"," Available on or before Oct. 22, 2020, via Internet Archive: Wayback Machine URL <https://web.archive.org/web/20201001000000*/https://google-research.github.io/seanet/multimodal/speech/>, retrieved on Dec. 18, 2023, URL<https://google-research.github.io/seanet/multimodal/speech/>, 8 pages.
Grais et al., "Single channel speech music separation using non-negative matrix factorization and spectral masks," 17th International Conference on Digital Signal Processing (DSP), 2011, 6 pages.
Graves et al., "Neural Turing Machines," CoRR, Submitted on Dec. 10, 2014, arXiv:1410.5401v2, 26 pages.
Gritsenko et al., "A Spectral Energy Distance for Parallel Speech Synthesis," CoRR, Submitted on Oct. 23, 2020, arXiv:2008.01160v2, 19 pages.
Gupta et al., "Speech bandwidth extension with WaveNet," CoRR, Submitted on Jul. 5, 2019, arXiv:1907.04927v1, 4 pages.
He et al., "Identity Mappings in Deep Residual Networks," CoRR, Submitted on Jul. 25, 2016, arXiv:1603.05027v3, 15 pages.
Hershey et al., "CNN Architectures for Large-Scale Audio Classification," CoRR, Submitted on Jan. 10, 2017, arXiv:1609.09430v2, 5 pages.
Hershey et al., "Model-Based Fusion of Bone and Air Sensors for Speech Enhancement and Robust Speech Recognition," ISCA Tutorial and Research Workshop on Statistical and Perceptual Audio Processing ICC Jeju, Korea, Oct. 3, 2004, 6 pages.
Hou et al., "Audio-Visual Speech Enhancement Using Multimodal Deep Convolutional Neural Networks," IEEE Transactions on Emerging Topics in Computational Intelligence, 2018, 11 pages.
Huang et al., "Deep learning for monaural speech separation," 2014 IEEE International Conference on Acoustics, Speech, and Signal Processing (ICASSP), 2014, 5 pages.
Kamath et al., "A multi-band spectral subtraction method for enhancing speech corrupted by colored noise," IEEE International Conference on Acoustics, Speech, and Signal Processing (ICASSP), May 13, 2002, 4 pages.
Karras et al., "Progressive Growing of GANs for Improved Quality, Stability, and Variation," International Conference on Learning Representations, 2018, 26 pages.
Kavalerov et al., "Universal sound separation," IEEE Workshop on Applications of Signal Processing to Audio and Acoustics (WASPAA), Oct. 20-23, 2019, 5 pages.
Kilgour et al., "Frechet Audio Distance: A Reference-free Metric for Evaluating Music Enhancement Algorithms," Interspeech, Sep. 15-19, 2019, pp. 2350-2354.
Kim et al., "Bandwidth Extension on Raw Audio via Generative Adversarial Networks," CoRR, Submitted on Mar. 21, 2019, arXiv:1903.09027v1, 10 pages.
Kingma et al., "Adam: A Method for Stochastic Optimization," CoRR, Submitted on Jan. 30, 2017, arXiv:1412.6980v9, 15 pages.
Kolbæk et al., "Multi-talker Speech Separation with Utterance-level Permutation Invariant Training of Deep Recurrent Neural Networks," CoRR, Submitted on Jul. 11, 2017, arXiv:1703.06284v2, 12 pages.
Kong et al., "Source separation with weakly labelled data: An approach to computational auditory scene analysis," CoRR, Submitted on Feb. 6, 2020, arXiv:2002.02065v1, 5 pages.
Kotropoulos et al., "Mobile Phone Identification Using Recorded Speech Signals," Proceedings of the 19th International Conference on Digital Signal Processing, Aug. 20-23, 2014, pp. 586-591.
Kraetzer et al., "Digital Audio Forensics: A First Practical Evaluation on Microphone and Environment Classification," Workshop on Multimedia & Security, Sep. 20-21, 2007, 11 pages.
Krizhevsky et al., "ImageNet Classification with Deep Convolutional Neural Networks," Advances in Neural Information Processing Systems 25, 2012, 9 pages.
Kuleshov et al., "Audio Super-Resolution using Neural Nets," CoRR, Submitted on Aug. 2, 2017, arXiv:1708.00853v1, 8 pages.
Kumar et al., "MelGAN: Generative Adversarial Networks for Conditional Waveform Synthesis," 33rd Conference on Neural Information Processing Systems, 2019, 12 pages.
Li et al., "Learning to Denoise Historical Music," CoRR, Submitted on Aug. 5, 2020, arXiv:2008.02027v1, 8 pages.
Li et al., "Real-time Speech Frequency Bandwidth Extension," CoRR, Submitted on Oct. 21, 2020, arXiv:2010.10677v1, 5 pages.

(56) References Cited

OTHER PUBLICATIONS

Lim et al., "Time-Frequency Networks for Audio Super-Resolution," 2018 IEEE International Conference on Acoustics, Speech and Signal Processing (ICASSP), 2018, 5 pages.
Liu et al., "Bone-conducted speech enhancement using deep denoising autoencoder," Speech Communication, Jul. 2, 2018, 104:106-112.
Loizou, "Speech Enhancement Based on Perceptually Motivated Bayesian Estimators of the Magnitude Spectrum," IEEE Transactions on Speech and Audio Processing, Sep. 2005, 13(5):857-869.
Luo et al., "TaSNet: Time-domain audio separation network for real-time, single-channel speech separation," IEEE International Conference on Acoustics, Speech and Signal Processing (ICASSP), 2018, pp. 696-700.
Maas et al., "Rectifier Nonlinearities Improve Neural Network Acoustic Models," Proceedings of the 30th International Conference on Machine Learning, 2013, 6 pages.
Maaten et al., "Visualizing Data using t-SNE," Journal of Machine Learning Research, Nov. 2008, 9(86):2579-2605.
Mach, "Denoising phonogram cylinders recordings using Structured Sparsity," 2015 7th International Congress on Ultra Modern Telecommunications and Control Systems and Workshops (ICUMT), 2015, pp. 314-319.
Madry et al., "Towards Deep Learning Models Resistant to Adversarial Attacks," CoRR, Submitted on Sep. 4, 2019, arXiv:1706.06083v4, 28 pages.
Mathur et al., "Mic2Mic: Using Cycle-Consistent Generative Adversarial Networks to Overcome Microphone Variability in Speech Systems," CoRR, Submitted on Mar. 27, 2020, arXiv:2003.12425v1, 12 pages.
Mathur et al., "Using Deep Data Augmentation Training to Address Software and Hardware Heterogeneities in Wearable and Smartphone Sensing Devices," 2018 17th ACM/IEEE International Conference on Information Processing in Sensor Networks, 2018, 12 pages.
Michalevsky et al., "Gyrophone: Recognizing Speech From Gyroscope Signals," Proceedings of the 23rd USENIX conference on Security Symposium, 2014, pp. 1053-1067.
Michelashvili et al., "Audio Denoising with Deep Network Priors," CoRR, Submitted on Nov. 12, 2019, arXiv:1904.07612v2, 5 pages.
Micirp.blogspot.com [online], "Microphone Impulse Response Project," available on or before Aug. 24, 2016, via Internet Archive: Wayback Machine URL <https://web.archive.org/web/20160515000000*/https://micirp.blogspot.com/p/about-micirp.html>, retrieved on Dec. 22, 2023, URL <https://micirp.blogspot.com/p/about-micirp.html>, 2 pages.
Ochiai et al., "Multimodal Speakerbeam: Single channel target speech extraction with audio-visual speaker clues," Interspeech 2019, Sep. 15-19, 2019, pp. 2718-2722.
Panayotov et al., "Librispeech: An ASR corpus based on public domain audio books," IEEE International Conference on Acoustics, Speech, and Signal Processing (ICASSP), 2015, 5 pages.
Park et al., "SpecAugment: A Simple Data Augmentation Method for Automatic Speech Recognition," CoRR, Submitted on Dec. 3, 2019, arXiv:1904.08779v3, 6 pages.
Pascual et al., "SEGAN: Speech Enhancement Generative Adversarial Network," Interspeech, Aug. 20-24, 2017, pp. 3642-3646.
Perez et al., "FiLM: Visual Reasoning with a General Conditioning Layer," CoRR, Submitted on Dec. 18, 2017, arXiv:1709.07871v2, 13 pages.
Perraudin et al., "Inpainting of long audio segments with similarity graphs," CoRR, Submitted on Feb. 23, 2018, arXiv:1607.06667v4, 13 pages.
Pishdadian et al., "Finding Strength in Weakness: Learning to Separate Sounds with Weak Supervision," IEEE/ACM Transactions on Audio, Speech, and Language Processing, Sep. 4, 2020, 16 pages.
Publicdomainproject.org [online], "Public Domain Project," available on or before May 1, 2010, via Internet Archive: Wayback Machine URL <https://web.archive.org/web/20100601000000*/https://en.publicdomainproject.org/index.php/Main_Page>, retrieved on Dec. 21, 2023, URL <https://en.publicdomainproject.org/index.php/Main_Page>, 2 pages.
Quitry et al., "Learning audio representations via phase prediction," CoRR, Submitted on Oct. 25, 2019, arXiv:1910.11910, 5 pages.
Reddy et al., "Soft Mask Methods for Single-Channel Speaker Separation," IEEE Transactions on Audio, Speech, and Language Processing, Aug. 2007, 15(6):1766-1776.
Rethage et al., "A Wavenet for Speech Denoising," CoRR, Submitted on Jan. 31, 2018, arXiv:1706.07162, 11 pages.
Ronneberger et al., "U-Net: Convolutional Networks for Biomedical Image Segmentation," Medical Image Computing and Computer-Assisted Intervention—MICCAI2015, 2015, pp. 234-241.
Roux et al., "SDR—half-baked or well done?," CoRR, Submitted on Nov. 6, 2018, arXiv:1811.02508v1, 5 pages.
Roux et al., "The Phasebook: Building Complex Masks via Discrete Representations for Source Separation," IEEE International Conference on Acoustics, Speech, and Signal Processing (ICASSP), Mar. 29, 2019, 6 pages.
Rybakov et al., "Streaming keyword spotting on mobile devices," CoRR, Submitted on Jul. 29, 2020, arXiv:2005.06720v2, 5 pages.
Salimans et al., "Weight Normalization: A Simple Reparameterization to Accelerate Training of Deep Neural Networks," 30th Conference on Neural Information Processing Systems, 2016, 9 pages.
Scalart et al., "Speech enhancement based on a priori signal to noise estimation," IEEE International Conference on Acoustics, Speech, and Signal Processing (ICASSP), 1996, 2:629-632.
Shor et al., "Towards Learning a Universal Non-Semantic Representation of Speech," CoRR, Submitted on Aug. 6, 2020, arXiv:2002.12764v6, 5 pages.
Slizovskaia et al., "Conditioned Source Separation for Music Instrument Performances," CoRR, Submitted on Apr. 8, 2020, arXiv:2004.03873v1, 13 pages.
Slizovskaia et al., "End-to-End Sound Source Separation Conditioned On Instrument Labels," CoRR, Submitted on May 9, 2019, arXiv:1811.01850v2, 5 pages.
Stockham, Jr. et al., "Blind Deconvolution Through Digital Signal Processing," Proceedings of the IEEE, Apr. 1975, 63(4):678-692.
Stoller et al., "Wave-U-Net: A Multi-Scale Neural Network for End-to-End Audio Source Separation," Proceedings of the 19th ISMIR Conference, Sep. 23-27, 2018, pp. 334-340.
Tagliasacchi et al., "Multi-Task Adapters for On-Device Audio Inference," IEEE Signal Processing Letters, 2020, 5 pages.
Tagliasacchi et al., "Pre-Training Audio Representations With Self-Supervision," IEEE Signal Processing Letters, 2020, 27:600-604.
Tagliasacchi et al., "SEANet: A Multi-modal Speech Enhancement Network," CoRR, Submitted on Oct. 1, 2020, arXiv:2009.02095v2, 5 pages.
Tzinis et al., "Improving Universal Sound Separation Using Sound Classification," CoRR, Submitted on Nov. 18, 2019, arXiv:1911.07951v1, 5 pages.
Verma et al., "CNN-based System for Speaker Independent Cell-Phone Identification from Recorded Audio," CVPR Workshops, 2019, pp. 53-61.
Virtanen et al., "SciPy 1.0: fundamental algorithms for scientific computing in Python," Nature Methods, Mar. 2020, pp. 261-272.
Wang et al., "Speech Super-Resolution Using Parallel WaveNet," 11th International Symposium on Chinese Spoken Language Processing (ISCSLP), 2018, 5 pages.
Wang et al., "VoiceFilter: Targeted Voice Separation by Speaker-Conditioned Spectrogram Masking," Interspeech, Sep. 15-19, 2019, pp. 2728-2732.
Warden, "Speech Commands: A Dataset for Limited-Vocabulary Speech Recognition," CoRR, Submitted on Apr. 9, 2018, arXiv:1804.03209v1, 11 pages.
Weninger et al., "Speech Enhancement with LSTM Recurrent Neural Networks and its Application to Noise-Robust ASR," Latent Variable Analysis and Signal Separation, Aug. 2015, 8 pages.
Wilson et al., "Exploring Tradeoffs in Models for Low-latency Speech Enhancement," CoRR, Submitted on Nov. 16, 2018, arXiv:1811.07030v1, 5 pages.

(56) References Cited

OTHER PUBLICATIONS

Wisdom et al., "Differentiable consistency constraints for improved deep speech enhancement," CoRR, Submitted on Nov. 20, 2018, arXiv:1811.08521v1, 5 pages.

Wisdom et al., "Unsupervised Sound Separation Using Mixtures of Mixtures," CoRR, Submitted on Jun. 23, 2020, arXiv:2006.12701v1, 14 pages.

Wolfel, "Enhanced Speech Features by Single-Channel Joint Compensation of Noise and Reverberation," IEEE Transactions on Audio, Speech, and Language Processing, Feb. 2009, 17(2):312-323.

Wu et al., "Group Normalization," CoRR, Submitted on Jun. 11, 2018, arXiv:1803.08494v3, 10 pages.

Xaudia.com [online], "Xaudia—Ribbon microphones, sales, and repairs" available on or before Feb. 7, 2011, via Internet Archive: Wayback Machine URL <https://web.archive.org/web/20110401000000*/https://xaudia.com/>, retrieved on Dec. 22, 2023, URL <https://xaudia.com/>, 2 pages.

Xu et al., "Recursive Visual Sound Separation Using Minus-Plus Net," CoRR, Submitted on Aug. 30, 2019, arXiv:1908.11602v1, 10 pages.

Zeghidour et al., "Wavesplit: End-to-End Speech Separation by Speaker Clustering," CoRR, Submitted on Jul. 2, 2020, arXiv:2002.08933v2, 10 pages.

Zhao et al., "Robust Speaker Identification in Noisy and Reverberant Conditions," IEEE/ACM Transactions on Audio, Speech, and Language Processing, Apr. 2014, 22(4):836-845.

Zhu et al., "Unpaired Image-to-Image Translation using Cycle-Consistent Adversarial Networks," Proceedings of the IEEE international conference on computer vision, 2017, pp. 2223-2232.

\* cited by examiner

GENERATING AUDIO WAVEFORMS USING ENCODER AND DECODER NEURAL NETWORKS

CROSS-REFERENCE TO RELATED APPLICATION

This application claims priority to U.S. Provisional Application No. 63/218,141, filed on Jul. 2, 2021. The disclosure of the prior application is considered part of and is incorporated by reference in the disclosure of this application.

BACKGROUND

This specification relates to processing data using machine learning models.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification describes an audio processing system implemented as computer programs on one or more computers in one or more locations.

Throughout this specification, an "audio waveform" can refer to data that includes a respective audio sample for each time step in a sequence of time steps. The audio sample for a time step can be represented, e.g., as a scalar numerical value.

The "sampling frequency" of an audio waveform can characterize, e.g., a duration of time separating the time steps in the audio waveform. For instance, the sampling frequency of an audio waveform can be measured in units of hertz, representing the number of time steps per second in the audio waveform.

A "block" in a neural network can refer to a group of one or more neural network layers in the neural network.

"Down-sampling" a set of vectors can refer to performing operations that reduce the number of vectors in the set of vectors.

"Up-sampling" a set of vectors can refer to performing operations that increase the number of vectors in the set of vectors.

A number of "channels" in a vector can refer to the dimensionality of the vector, e.g., such that a vector $x \times \mathbb{R}^d$ may be referred to as having d channels.

A "vector" refers to an ordered collection of one or more numerical values, e.g., a tensor of one or more numerical values.

Particular embodiments of the subject matter described in this specification can be implemented so as to realize one or more of the following advantages.

The audio processing system described in this specification can process an input audio waveform using an encoder neural network followed by a decoder neural network. The encoder neural network progressively down-samples a set of feature vectors representing the input audio waveform through a sequence of encoder blocks, thus generating a rich set of feature vectors that compactly represent relevant information from the input audio waveform. The decoder neural network progressively up-samples the output of the encoder neural network through a sequence of decoder blocks to accurately decode the output audio waveform by integrating information from feature vectors generated by the encoder neural network. The audio processing system can include skip-connections between encoder blocks and corresponding decoder blocks, facilitating multi-resolution feature propagation between the encoder neural network and the decoder neural network. The synergistic architectural features of the encoder and decoder neural networks allow the audio processing system to be trained to effectively perform audio processing tasks over fewer training iterations and using less training data than would be required for training some conventional systems.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
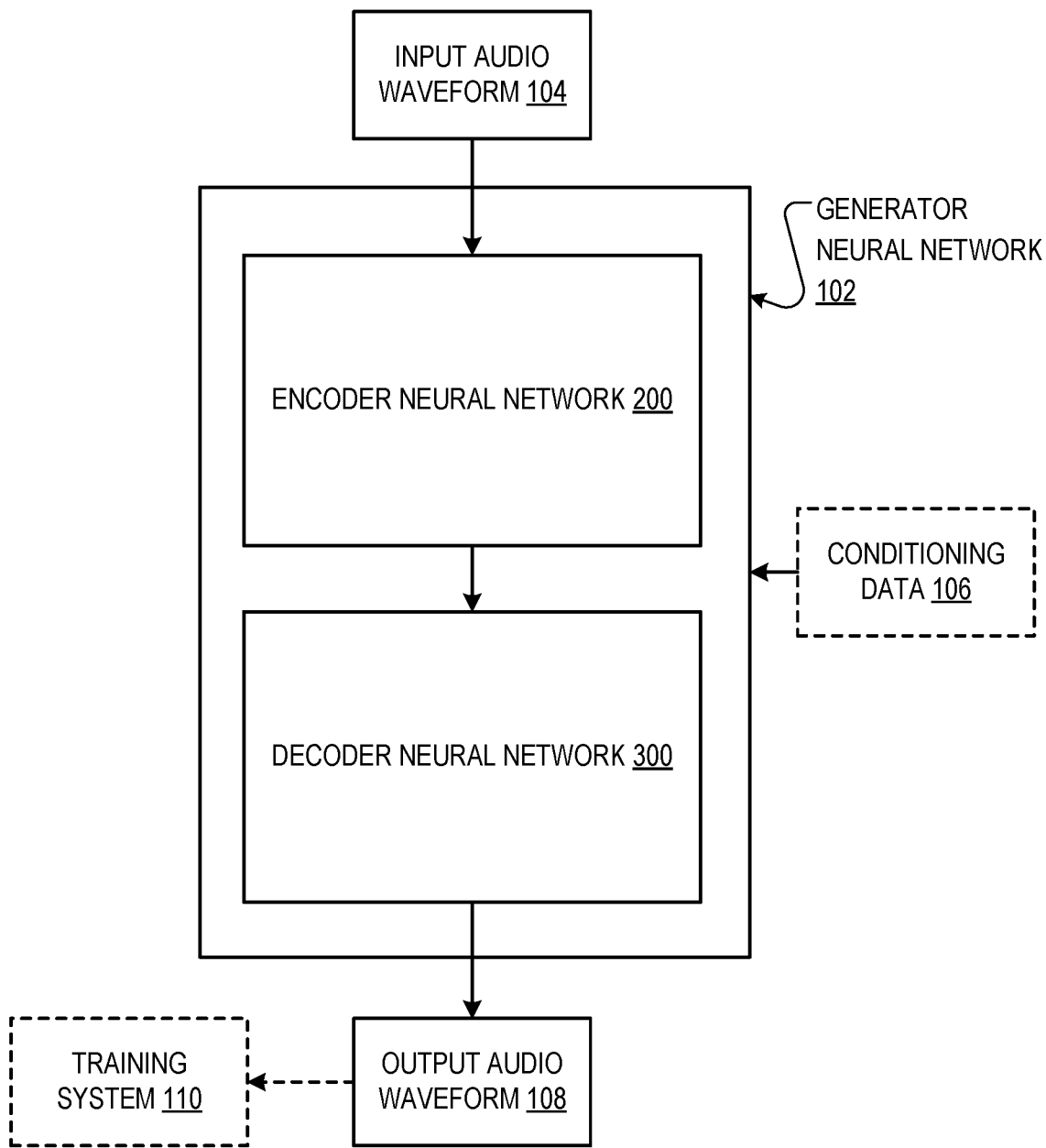
FIG. 1 shows an example audio processing system.

FIG. 1 shows an example audio processing system 100. The audio processing system 100 is an example of a system implemented as computer programs on one or more computers in one or more locations in which the systems, components, and techniques described below are implemented.

The audio processing system 100 is configured to perform an audio processing task, in particular, by processing an input audio waveform 104 (and, optionally, conditioning data 106) using a generator neural network 102 to generate a corresponding output audio waveform 108.

The input audio waveform 104 can be generated by a microphone and can include any appropriate sounds. For instance, the input audio waveform 104 can represent the voices of one or more people along with background noise (e.g., birds singing, passing cars, wind, etc.). As another example, the input audio waveform can represent music, e.g., generated by one or more musical instrument and voices. The microphone that generated the input audio waveform can be located in any appropriate location, e.g., on a user device (e.g., a headphone or telephone), in a music studio, in an outdoor location such as a street, etc.

The audio processing system 100 can be configured to perform any of a variety of audio processing tasks. A few illustrative examples of audio processing tasks that can be performed by the audio processing system 100 are described next.

In some implementations, the audio processing system 100 performs an audio enhancement task, e.g., by processing an input audio waveform 104 to generate an output audio waveform 108 that is an enhanced version of the input audio waveform 104.

For example, the audio enhancement task can be a de-noising task, i.e., where the output audio waveform 108 is a de-noised version of the input audio waveform. More specifically, in this example, the input audio waveform can be understood as a distorted version of an original audio waveform, where the distortions to the original audio waveform may have been caused by factors such as background noise and reverberation. In performing the de-noising task, the audio processing system 100 generates an output audio waveform 108 that is an estimate of the original audio waveform.

In another example, the audio enhancement task can be a frequency bandwidth extension task, e.g., where the output audio waveform 108 represents a version of the input audio waveform captured at a higher sampling frequency.

In some implementations, the audio processing system 100 performs a filtering task, e.g., by generating an output audio waveform 108 that represents a version of the input audio waveform that has been filtered to include only audio from a target audio source. The target audio source can be, e.g., the voice of a particular person, a particular musical instrument, or any other appropriate category of sound.

In some implementations, the audio processing system 100 performs a microphone style transfer task. More specifically, the audio processing system 100 processes an input audio waveform that is captured using a "target" microphone to generate an output audio waveform corresponding to a "source" microphone. The output audio waveform represents the sounds encoded in the input audio waveform as if they had been captured by the source microphone. Generally, the audio waveform captured by a microphone depends on factors such as the microphone impulse response, room reverberation at the location of the microphone, the microphone audio processing pipeline, and microphone clipping thresholds. By performing a microphone style transfer task, the audio processing system 100 can convert an input audio waveform captured using a target microphone into a corresponding output audio waveform that would have been captured by a source microphone.

An audio processing system 100 that is configured to perform a microphone style transfer task can be used to optimize the parameters of a microphone model that defines a mapping from audio waveforms captured using the source microphone to audio waveforms captured using a target microphone. The optimized microphone model can be used as part of a process for augmenting a set of training examples used for training a machine learning model to perform an audio processing task, e.g., speech recognition, audio classification, etc. In particular, the optimized microphone model can be used to generate new training examples based on audio waveforms corresponding to the target microphone. Training the machine learning model on the augmented set of training examples can improve the robustness and generalizability of the machine learning model. An example process for processing an audio waveform using a microphone model to generate a version of the audio waveform that would have been captured by a target microphone is described with reference to FIG. 6. An example process for optimizing the parameters of a microphone model and using the microphone model to augment a set of training examples is described with reference to FIG. 7.

In some implementations, the audio processing system 100 performs an audio anonymization task by processing an input audio waveform representing words spoken by a person to generate an output audio waveform that is an anonymized version of the input audio waveform. More specifically, the output audio waveform represents the words spoken in the input audio waveform as if they have been verbalized by a text-to-speech model.

The conditioning data 106 can include any appropriate auxiliary data. A few examples of conditioning data 106 are described next.

In some implementations, the conditioning data 106 can include one or more accelerometer waveforms that each correspond to a respective acceleration axis (e.g., x-, y-, or z-axes). Accelerometer waveforms can be captured by an accelerometer device. An accelerometer waveform corresponding to an acceleration axis can measure a respective acceleration of the accelerometer device in the direction of the acceleration axis at each time point in a sequence of time points. Accelerometer waveforms can thus represent vibration and movement. In particular, an accelerometer device mounted on an apparatus worn on the head of a user, e.g., a headphone, e.g., an earbud, can capture movement and vibration in the bones of the skull of the user. For convenience, an accelerometer that captures movement and vibration in the bones of the skull of a user may be referred to as a "bone conductance" accelerometer.

Bone conductance accelerometer data can be provided to the audio processing system 100 as conditioning data 106, e.g., when the audio processing system 100 is configured to perform a de-noising task. More specifically, in the de-noising task, the input audio waveform 104 can represent a distorted version of an original audio waveform that represents the voice of a user, and the output audio waveform 108 can represent an estimate of the original audio waveform representing the voice of the user. Bone conductance accelerometer data can capture local vibrations induced by the voice of the user while being relatively insensitive to external sounds sources (e.g., background noise). Bone conductance accelerometer data thus encodes auxiliary information relevant to the de-noising task, and processing bone conductance accelerometer data as conditioning data 106 can enable the audio processing system 100 to perform de-noising tasks more effectively (e.g., more accurately).

An accelerometer can capture accelerometer data (e.g., bone conductance accelerometer data) synchronously with a microphone that captures an input audio waveform 104. In some instances, the accelerometer can capture accelerometer data at a lower sampling frequency than the microphone. Optionally, the audio processing system 100 can interpolate the accelerometer data to the same sampling frequency as the input audio waveform 104.

In some implementations, the audio processing system 100 is configured to perform a filtering task (as described above) to isolate audio from a target source in an input audio waveform, and the conditioning data 106 can define an audio waveform representing an example of audio from the target source. More specifically, the audio processing system 100 can process an input audio waveform that includes audio from multiple sources to generate an output audio waveform that includes only the part of the input audio waveform from a target source. The conditioning data 106 specifies the target source, in particular, by defining an example of an audio waveform from the target source. For instance, if the target source is the voice of a particular person, then the conditioning data 106 can include an audio waveform that represents speech by the particular person. As another example, if the target source is a particular instrument (e.g., drums, guitar, trombone, etc.), then the conditioning data 106 can include an audio waveform that represents sound generated by the instrument.

The audio processing system 100 performs an audio processing task by processing the input audio waveform 104 (and, optionally, conditioning data 106) using a generator neural network 102. The generator neural network 102 can include an encoder neural network 200 and a decoder neural network 300, which are each described in more detail next.

The encoder neural network 200 is configured to process the input audio waveform 104 to generate a set of feature vectors representing the input audio waveform 104. In particular, the encoder neural network 200 includes a sequence of encoder blocks, where each encoder block is configured to process a set of input feature vectors to generate a set of output feature vectors. As part of processing the set of input feature vectors, each encoder block can perform operations to down-sample the set of input feature vectors. Thus, the set of output feature vectors generated by the encoder block includes fewer feature vectors that the set of input feature vectors received by the encoder block. An example of an encoder neural network is described in more detail with reference to FIG. 2.

The decoder neural network 300 is configured to process the set of feature vectors generated by the encoder neural network 200 to generate the output audio waveform 108. In particular, the decoder neural network 300 includes a sequence of decoder blocks, where each decoder block is configured to process a set of input feature vectors to generate a set of output feature vectors. As part of processing the set of input feature vectors, each decoder block can perform operations to up-sample the set of input feature vectors. Thus, the set of output feature vectors generated by the decoder block include more feature vectors than the set of input feature vectors received by the decoder block. An example of a decoder neural network is described in more detail with reference to FIG. 3.

The generator neural network 102 can jointly process the conditioning data 106 along with the input audio waveform 104 as part of generating the output audio waveform 108. A few example techniques by which the encoder neural network 200, the decoder neural network 300, or both can be conditioned on the conditioning data 106 are described in more detail below with reference to FIG. 2 and FIG. 3.

Optionally, the audio processing system 100 can include a sequence of multiple generator neural networks 102, i.e., rather than a single generator neural network 102. More specifically, the first generator neural network 102 in the sequence can be configured to receive the input audio waveform 104 provided as an input to the audio processing system 100. Each subsequent generator neural network 102 can be configured to receive the output audio waveform 108 generated by the preceding generator neural network in the sequence of generator neural networks. The output audio waveform 108 generated by the final generator neural network in the sequence of generator neural networks can be defined as the output of the audio processing system 100.

In implementations where the audio processing system 100 includes a sequence of multiple generator neural networks, each generator neural network can be associated with a respective resolution parameter. The audio processing system 100 can down-sample the input audio waveform provided to each generator neural network based on the resolution parameter associated with the generator neural network. Further, the audio processing system 100 can up-sample the output audio waveform generated by each generator neural network based on the resolution parameter associated with the generator neural network.

For instance, each generator neural network can be associated with a non-negative integer resolution parameter k. For each generator neural network, the audio processing system 100 can down-sample the input audio waveform provided to the generator neural network by a factor of $2^k$, and can up-sample the output audio waveform generated by the generator neural network by a factor of $2^k$, where k is the resolution parameter associated with the generator neural network.

In some cases, for each generator neural network after the first generator neural network, the input audio waveform provided to the generator neural network is down-sampled by a smaller factor than the input audio waveform provided to the preceding generator neural network. Moreover, the audio processing system 100 can refrain from performing any down-sampling on the input audio waveform provided to the final generator neural network in the sequence of generator neural networks. Thus each generator neural network can be configured to process the input audio waveform provided to the generator neural network at a progressively higher resolution.

The audio processing system 100 can down-sample or up-sample an audio waveform in accordance with a resolution parameter using any appropriate technique. For example, the audio processing system 100 can map the resolution parameter to a corresponding a new sampling frequency, and interpolate the audio waveform over a new set of time points that are spaced in accordance with the new sampling frequency.

Implementing the audio processing system 100 using a sequence of multiple generator neural networks can enable the audio processing system 100 to generate the output audio waveform 108 by a process of multi-stage inference. In particular, configuring the generator neural networks to operate on their respective input audio waveforms at progressively higher resolutions can allow the audio processing system 100 to learn to perform multi-stage, multi-resolution inference that enables the generation of output audio waveforms with higher accuracy.

The audio processing system 100 can include a training system 110 that is configured to train the generator neural network(s) 102 based on a set of training examples. Each training example includes: (i) a training input to the audio processing system, including an input audio waveform 104, and optionally, conditioning data 106, and (ii) a target audio waveform that should be generated by the audio processing system by processing the training input. An example process for training the generator neural network(s) included in the audio processing system 100 is described in more detail below with reference to FIG. 5.

The generator neural network 102 can be implemented in any appropriate location. For example, the generator neural network 102 can be implemented in a data center, or on a user device (e.g., a mobile device).

Figure 2:
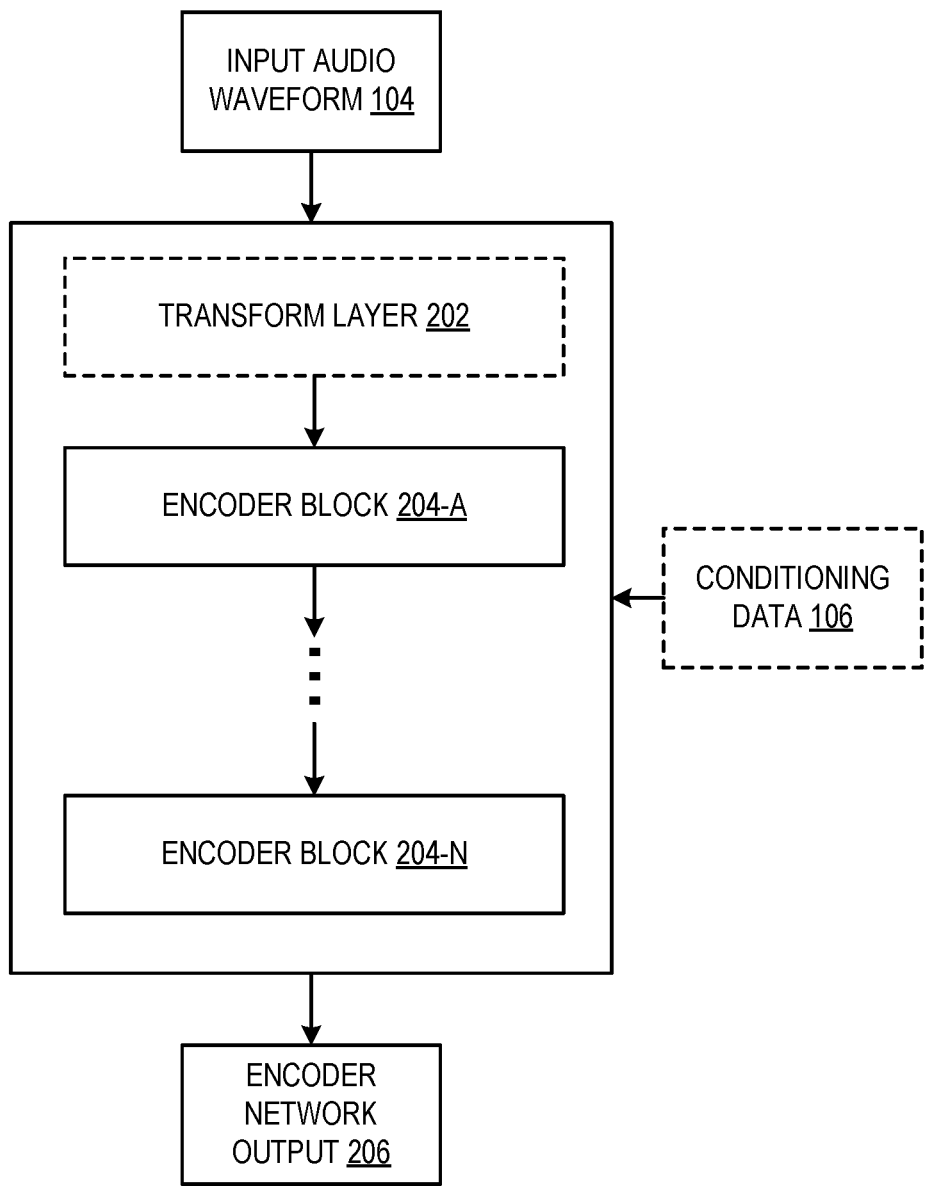
FIG. 2 shows an example architecture of an encoder neural network.

FIG. 2 shows an example architecture of an encoder neural network 200, e.g., that is included in the generator neural network 102 described with reference to FIG. 1.

The encoder neural network 200 is configured to process an input that includes an input audio waveform 104 (and, optionally, conditioning data 106) to generate an encoder network output 206 that includes a set of output feature vectors defining an embedded representation of the input audio waveform 104.

The input audio waveform 104 that is provided to the encoder neural network 200 can be represented by a set of input feature vectors. For instance, each audio sample in the input audio waveform be defined be a respective feature vector having a single channel, i.e., that defines the value of the audio sample.

The encoder neural network 200 can include an optional transform layer 202 and a sequence of one or more encoder blocks 204-A-N, as will be described in more detail next. (The encoder neural network 200 can also include one or more additional neural network blocks/layers, i.e., in addition to the optional transform layer 202 and the sequence of encoder blocks 204-A-N show in FIG. 2).

The transform layer 202, which is optional, is configured to map the input audio waveform 104 (which is represented in the time domain) to an alternative representation in an alternative domain. The alternative domain can be any appropriate domain, e.g., a frequency domain or a time-frequency domain. A few examples of operations that can be performed by the transform layer 202 are described next.

In one example, the transform layer 202 can apply a Fourier transform, e.g., a discrete Fourier transform (DFT), to map the input audio waveform 104 to an alternative representation in the frequency domain. An alternative representation of the input audio waveform in the frequency domain can include a respective score for each of multiple frequency values.

In another example, the transform layer can apply a short-time Fourier transform (STFT) to map the input audio waveform 104 into an alternative representation in the time-frequency domain. An alternative representation in the time-frequency domain can include a respective complex score (e.g., having a real part and an imaginary part) for each of multiple time-frequency value pairs.

The result of transforming the input audio waveform 104 into an alternative representation in an alternative domain can be represented as a set of feature vectors. For instance, a representation of the input audio waveform in the frequency domain can be represented by a respective feature vector for each frequency value, and a representation of the input audio waveform in the time-frequency domain can be represented by a respective feature vector for each time-frequency value.

Each encoder block 204 in the encoder neural network 200 is configured to process a respective set of input feature vectors, in accordance with a set of encoder block parameters, to generate a set of output feature vectors. More specifically, the first encoder block in the sequence of encoder blocks can receive an input set of feature vectors representing the input audio waveform (either in the time domain, or in an alternative domain defined by the transform layer 202). Each subsequent encoder block 204 can receive an input set of feature vectors generated as the output of the preceding encoder block in the sequence of encoder blocks. The set of output feature vectors generated by the final encoder block in the sequence of encoder blocks can define the encoder network output 206.

Each encoder block 204 down-samples the set of input feature vectors provided to the encoder block 204 as part of generating a set of output feature vectors, i.e., such that the set of output feature vectors includes fewer feature vectors than the set of input feature vectors. An encoder block can down-sample a set of input feature vectors, e.g., using a convolutional neural network layer that implements a strided convolution operation with a stride larger than one. (The stride of a convolution operation refers to the spacing between locations where the convolution kernel is applied to the set of input feature vectors).

A strided convolution operation implemented by an encoder block can be, e.g., a one-dimensional (1D) or two-dimensional (2D) strided convolution operation (where the dimensionality of a convolution operation can refer to the dimensionality of the corresponding convolution kernel). For instance, if the set of input feature vectors to the encoder block are arranged in a 1D array (e.g., when the input audio waveform is represented in a 1D domain, e.g., the time domain or the frequency domain), then the strided convolution operation can be a 1D strided convolution operation. As another example, if the set of input feature vectors to the encoder block are arranged in a 2D array (e.g., when the input audio waveform is represented in a 2D domain, e.g., the time-frequency domain), then the strided convolution operation can be a 2D strided convolution operation.

In a particular example, the encoder neural network 200 can include four encoder blocks, where the first and second encoder blocks down-sample by a factor of 2, and the third and fourth encoder blocks down-sample by a factor of 8.

Each encoder block 204, in addition to down-sampling the set of input feature vectors, can generate output feature vectors having a higher dimensionality (e.g., a larger number of channels) than the input feature vectors. For instance, the strided convolution operation that down-samples the set of input feature vectors can simultaneously increase (e.g., double) the dimensionality of the feature vectors.

Generally, each encoder block can include any appropriate neural network layers in any appropriate configuration that enables the encoder block to perform its described functions. For instance, each encoder block can include one or more dilated convolutional neural network layers, one or more residual blocks, or both. In a dilated convolutional layer, the elements of the convolution kernel are spaced apart to increase the field of view of the convolution operation. A residual block can refer to a set of neural network layers that includes a skip-connection that adds the input to the residual block to the output of the residual block.

Optionally, the input to the encoder neural network 200 can include conditioning data 106, i.e., in addition to the input audio waveform 104. The encoder neural network 200 can be configured to jointly process the input audio waveform 104 and the conditioning data 106 in a variety of possible ways. A few example techniques for jointly processing the input audio waveform 104 and the conditioning data 106 are described next.

In some implementations, the encoder neural network 200 can concatenate the conditioning data 106 to the input audio waveform 104 prior to processing the input audio waveform 104. For example, the conditioning data 106 can include one or more conditioning waveforms that are each time-aligned with the input audio waveform 104, and the encoder neural network 200 can concatenate each of the conditioning waveforms to the input audio waveform along the time dimension. More specifically, each conditioning waveform can include a respective sample for each time step in the input audio waveform 104, and for each time step in the input audio waveform 104, the encoder neural network can concatenate the respective sample from each conditioning waveform for the time step. (The conditioning waveforms can be, e.g., accelerometer waveforms, or target audio waveforms, as described above with reference to FIG. 1).

In some implementations, the encoder neural network 200 can process the conditioning data 106 using a neural network, referred to for convenience as a "conditioning" neural network, to generate a conditioning vector representing the conditioning data 106. The encoder neural network 200 can then condition the encoder neural network on the conditioning vector in any appropriate manner. For example, each of one or more encoder blocks of the encoder neural network 200 can include one or more neural network layers, referred to for convenience as "affine projection" neural network layers, that are configured to process the conditioning vector to generate an output that parameterizes an affine transformation. The affine transformation can define, for each channel in the set of channels of the output feature vectors generated by the encoder block, a scaling factor and an additive factor. The encoder block can apply the affine transformation to each channel of each output feature vector generated by the encoder block, e.g., by scaling each channel of each output feature vector by the corresponding scaling factor, and by summing the additive factor with each channel of each output feature vector.

The conditioning neural network can have any appropriate neural network architecture that enables it to perform its described functions, e.g., processing conditioning data 106 to generate a conditioning vector. In particular, the conditioning neural network can include any appropriate types of neural network layers (e.g., fully-connected layers, convolutional layers, attention layers, etc.) in any appropriate number (e.g., 2 layers, 5 layers, or 10 layers) and connected in any appropriate configuration (e.g., as a linear sequence of layers).

In some implementations, the conditioning data 106 can include one or more conditioning waveforms, and the conditioning neural network can be configured to process a concatenation of the conditioning waveforms to generate a set of feature vectors representing the conditioning waveforms. For instance, the conditioning neural network can generate the set of feature vectors by processing the concatenation of the conditioning waveforms using one or more encoder blocks having the same architecture as the encoder blocks 204-A-N. The conditioning neural network can then generate the conditioning vector based on the set of feature vectors representing the conditioning waveforms. A few example techniques by which the conditioning neural network can generate the conditioning vector based on the set of feature vectors representing the conditioning waveforms are described next.

In one example, the conditioning neural network can generate the conditioning vector by pooling, e.g., element-wise combining, the set of feature vectors representing the conditioning waveforms. For instance, the conditioning neural network can generate the conditioning vector by averaging, summing, or max-pooling the set of feature vectors representing the conditioning waveforms.

In another example, the conditioning neural network can generate the conditioning vector as a linear combination of the set of feature vectors representing the conditioning waveforms. More specifically, the conditioning neural network can generate a respective score for each feature vector in the set of feature vectors representing the conditioning waveforms based on a similarity measure between: (i) the feature vector, and (ii) a pooled feature vector. The conditioning neural network can generate the pooled feature vector by element-wise combining (e.g., max-pooling or averaging) the set of feature vectors representing the conditioning waveforms. The similarity measure can be, e.g., a cosine similarity measure, an $L_1$ similarity measure, an $L_2$ similarity measure, or any other appropriate similarity measure. The conditioning neural network can then generate the conditioning vector as a linear combination of the set of feature vectors representing the conditioning waveform, where each feature vector is scaled by the corresponding score for the feature vector.

Figure 3:
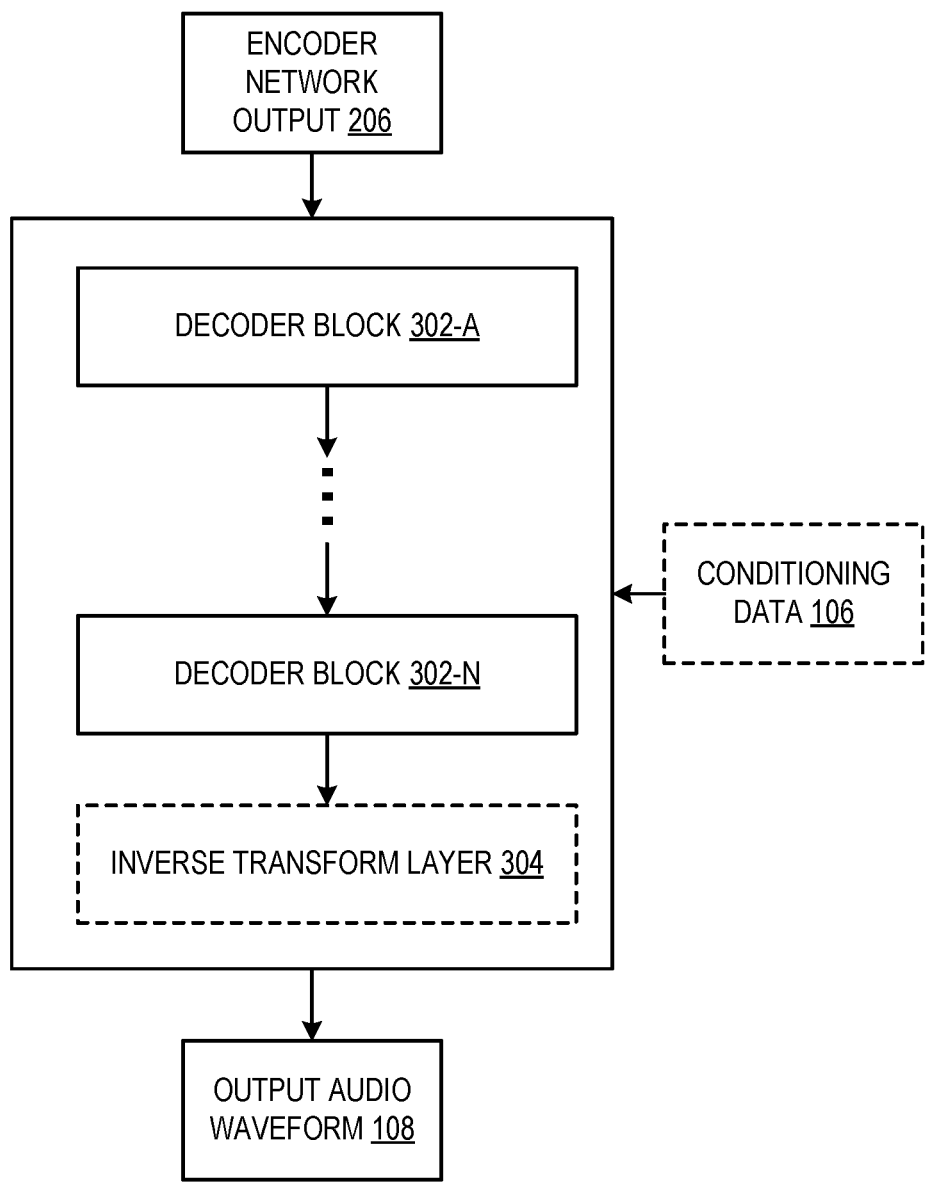
FIG. 3 shows an example architecture of a decoder neural network.

FIG. 3 shows an example architecture of a decoder neural network 300, e.g., that is included in the generator neural network 102 described with reference to FIG. 1.

The decoder neural network 300 is configured to process an input that includes an encoder network output 206 generated by the encoder neural network 200 for an input audio waveform (and, optionally, conditioning data 106) to generate an output audio waveform 108. The encoder network output 206 includes a set of feature vectors representing the input audio waveform.

The decoder neural network 300 can include a sequence of one or more decoder blocks 302-A-N and an optional inverse transform layer 304, as will be described in more detail next. (The decoder neural network 300 can also include one or more additional neural network blocks/layers, i.e., in addition to the sequence of decoder blocks 302-A-N and the optional inverse transform layer show in FIG. 3).

Each decoder block 302 in the decoder neural network 300 is configured to process a respective set of input feature vectors, in accordance with a set of decoder block parameters, to generate a set of output feature vectors.

The first decoder block in the sequence of decoder blocks can receive an input set of feature vectors representing the encoder network output 206.

Each subsequent decoder block 302 can receive an input set of feature vectors based at least in part on the output of the preceding decoder block in the sequence of decoder blocks. A few examples of possible input feature vectors for decoder blocks after the first decoder block are described next.

In one example, for each decoder block after the first decoder block, the input set of feature vectors can be given by the set of feature vectors generated by the preceding decoder block.

As another example, for each decoder block after the first decoder block, the input set of feature vectors can be given a combination of: (i) the set of feature vectors generated by the preceding decoder block, and (ii) a set of feature vectors generated by a corresponding encoder block in the encoder neural network. That is, the generator neural network can include skip connections from the encoder blocks of the encoder neural network to the decoder blocks of the decoder neural network. The encoder block corresponding to a decoder block can be an encoder block that generates feature vectors having the same dimensionality as the feature vectors generated by the preceding decoder block. The decoder neural network can generate each input feature vector in the set of input feature vectors for a decoder block as a combination (e.g., a sum or average) of a feature vector generated by the preceding decoder block and a corresponding feature vector generated by an associated encoder block.

Each decoder block 302 up-samples the set of input feature vectors provided to the decoder block 302 as part of generating a set of output feature vectors, i.e., such that the set of output feature vectors includes more feature vectors than the set of input feature vectors. A decoder block can up-sample a set of input feature vectors, e.g., using a convolutional neural network layer that implements a strided transposed convolution operation with a stride larger than one.

A strided transposed convolution operation implemented by an decoder block can be, e.g., a one-dimensional (1D) or two-dimensional (2D) strided transposed convolution operation. For instance, if the set of input feature vectors to the decoder block are arranged in a 1D array, then the strided transposed convolution operation can be a 1D strided transposed convolution operation. As another example, if the set of input feature vectors to the decoder block are arranged in a 2D array, then the strided transposed convolution operation can be a 2D strided transposed convolution operation.

In a particular example, the decoder neural network 300 can include four decoder blocks, where the first and second decoder blocks up-sample by a factor of 8, and the third and fourth decoder blocks up-sample by a factor of 2.

Each decoder block 302, in addition to up-sampling the set of input feature vectors, can generate output feature vectors having a lower dimensionality (e.g., a smaller number of channels) than the input feature vectors. For instance, the strided transposed convolution operation that up-samples the set of input feature vectors can simultaneously decrease (e.g., half) the dimensionality of the feature vectors.

Generally, each decoder block can include any appropriate neural network layers in any appropriate configuration that enables the decoder block to perform its described functions. For instance, each decoder block can include one or more dilated convolutional neural network layers, one or more residual blocks, or both.

Optionally, the decoder neural network 300 can process conditioning data 106, i.e., in addition to the encoder network output 206. The decoder neural network 300 can be configured to jointly process the encoder network output 206 and the conditioning data 106 in a variety of possible ways. For instance, as described with reference to FIG. 2, the generator neural network can process the conditioning data to generate a conditioning vector, and then condition one or more decoder blocks of the decoder neural network 300 on the conditioning vector. Example techniques for conditioning a neural network block on a conditioning vector, e.g., using affine projection neural network layers, are described above with reference to FIG. 2.

The final decoder block in the sequence of decoder blocks of the decoder neural network 300 can generate a set of output feature vectors that define a representation of the output audio waveform 108. In some implementations, the set of output feature vectors generated by the final decoder block can define the output audio waveform 108 in the time domain, e.g., by defining a respective audio sample for each time step in a sequence of time steps. In some implementations, the set of output feature vectors generated by the final decoder block can define the output audio waveform in an alternative domain, i.e., other than the time domain. The alternative domain can be, e.g., the frequency domain or the time-frequency domain. For instance, if the alternative domain is the frequency domain, then the set of output feature vectors generated by the final decoder block can define a respective score for each of multiple frequency values. As another example, if the alternative domain is the time-frequency domain, then the set of output feature vectors generated by the final decoder block can define a complex score (e.g., having a real part and an imaginary part) for each of multiple time-frequency value pairs.

If the set of output feature vectors generated by the final decoder block defines a representation of the output audio waveform 108 in an alternative domain, then the decoder neural network 300 can include an inverse transform layer 304. The inverse transform layer 304 is configured to process the representation of the output audio waveform 108 in the alternative domain to generate a representation of the output audio waveform in the time domain. For instance, if the final decoder block generates a representation of the output audio waveform 108 in the frequency domain, then the inverse transform layer 304 can implement an inverse DFT operation. As another example, if the final decoder block generates a representation of the output audio waveform 108 in the time-frequency domain, then the inverse transform layer 304 can implement an inverse STFT operation.

Figure 4:
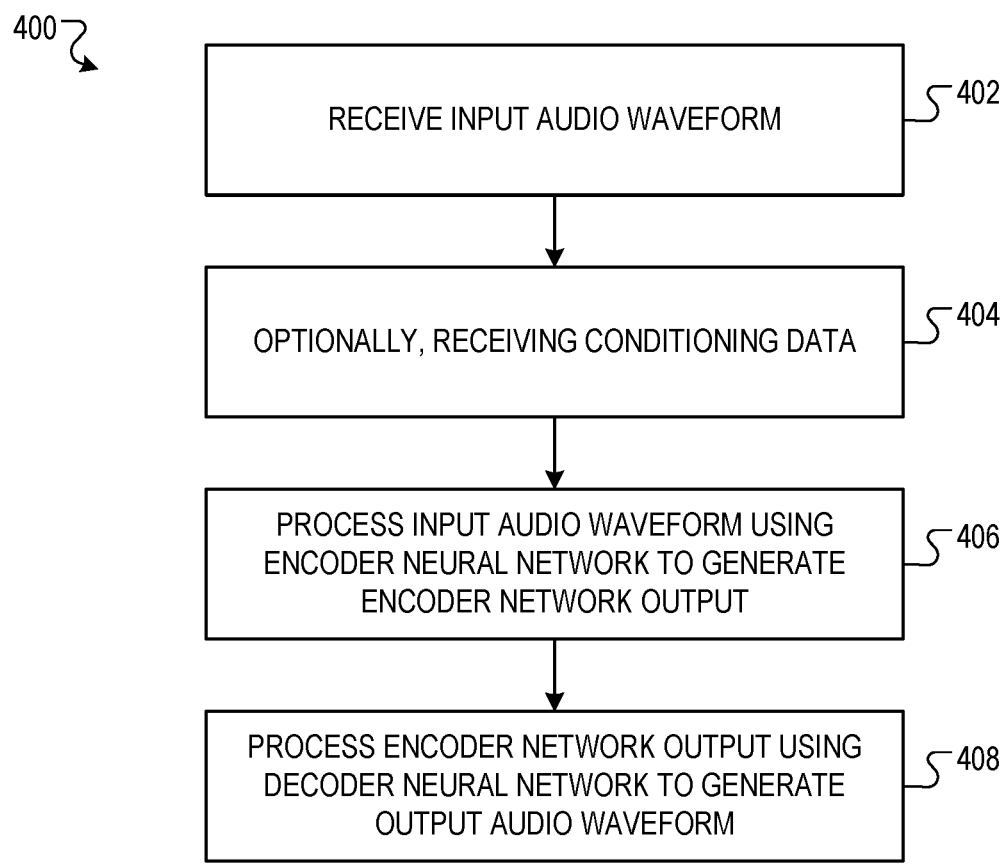
FIG. 4 is a flow diagram of an example process for processing an input audio waveform using a generator neural network to generate an output audio waveform.

FIG. 4 is a flow diagram of an example process 400 for processing an input audio waveform using a generator neural network to generate an output audio waveform. For convenience, the process 400 will be described as being performed by a system of one or more computers located in one or more locations. For example, an audio processing system, e.g., the audio processing system 100 of FIG. 1, appropriately programmed in accordance with this specification, can perform the process 400.

The system receives an input audio waveform (402).

Optionally, the system receives conditioning data corresponding to the input audio waveform (404). The conditioning data can include, e.g., one or more conditioning waveforms. For example, the conditioning waveforms can be accelerometer waveforms, e.g., captured by an accelerometer mounted on a headphone (e.g., earbud), where the headphone includes a microphone that captured the input audio waveform synchronously with the accelerometer waveforms. In this example, the generator neural network may be configured to perform a de-noising task, i.e., by generating an output audio waveform that is a de-noised version of the input audio waveform, and the accelerometer waveforms provide an auxiliary data source that enables more effective de-noising. As another example, the conditioning waveforms can include a conditioning audio waveform that provides an example of an audio waveform generated by a target source, e.g., the conditioning audio waveform can represent the voice of a particular person, or the sound of a particular musical instrument. In this example, the generator neural network may be configured to perform a filtering task, e.g., by generating an output audio waveform that is filtered to only include audio from the target source.

The system processes the input audio waveform using an encoder neural network of the generator neural network to generate an encoder network output that includes a set of feature vectors representing the input audio waveform (406). The encoder neural network can include a sequence of encoder blocks that are each configured to process a set of input feature vectors to generate a down-sampled set of output feature vectors.

In some implementations, the system concatenates the conditioning waveforms to the input audio waveform prior to processing the input audio waveform using the encoder neural network.

In some implementations, the system processes the conditioning waveforms using a conditioning neural network to generate a conditioning vector, and then conditions one or more of the encoder blocks on the conditioning vector.

The system processes the encoder network output using a decoder neural network of the generator neural network to generate an output audio waveform (408). The decoder neural network can include a sequence of decoder blocks that are each configured to process a set of input feature vectors to generate an up-sampled set of output feature vectors. Optionally, the system can condition one or more of the decoder blocks of the decoder neural network on a conditioning vector representing the conditioning waveforms.

Figure 5:
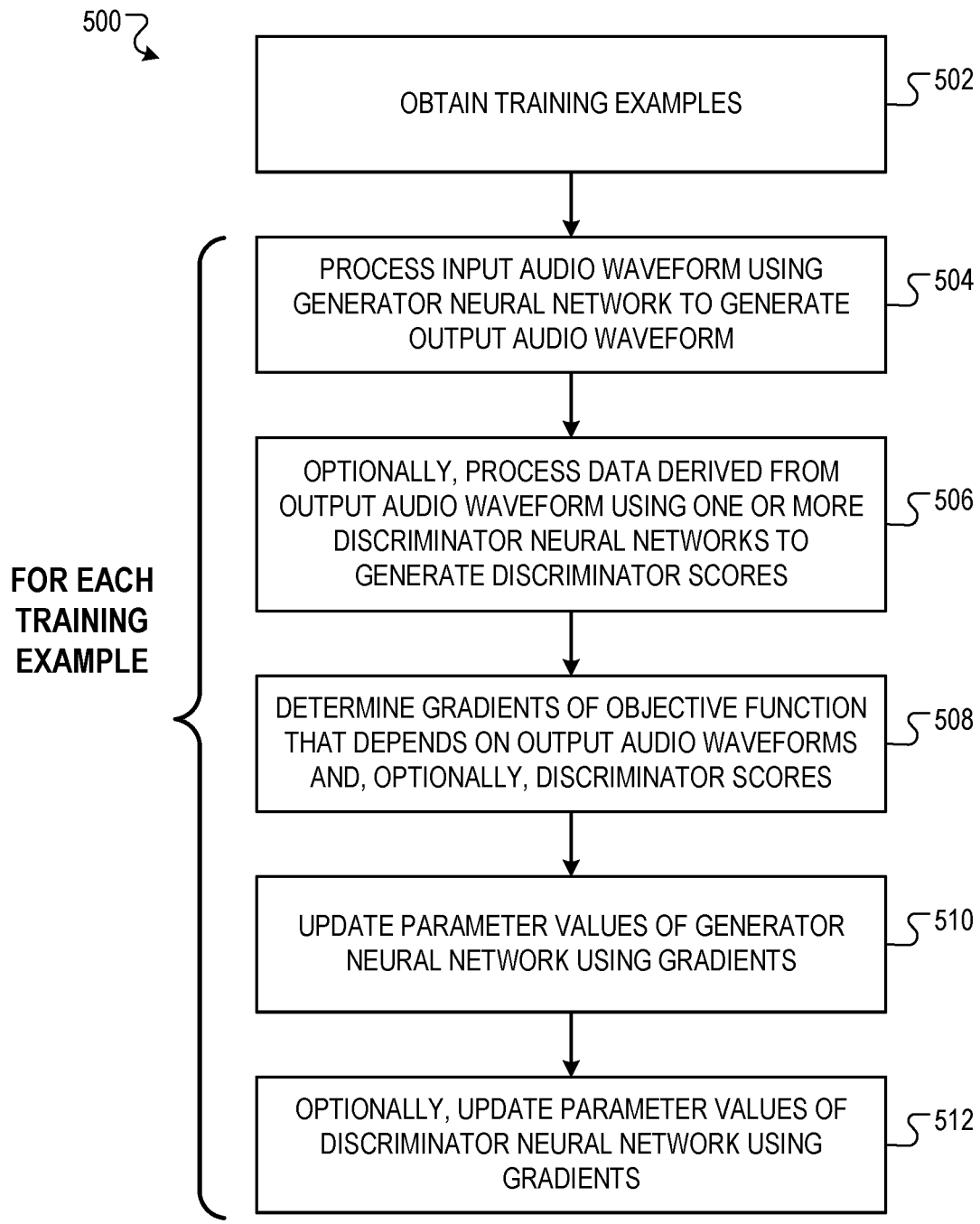
FIG. 5 is a flow diagram of an example process for training a generator neural network.

FIG. 5 is a flow diagram of an example process 500 for training a generator neural network. The generator neural network can be any appropriate neural network that is configured to process an input audio waveform (and, optionally, conditioning data) to generate an output audio waveform. The generator neural network can, for example, have the architecture described with reference to FIG. 1-FIG. 3. For convenience, the process 500 will be described as being performed by a system of one or more computers located in one or more locations. For example, a training system, e.g., the training system 110 of FIG. 1, appropriately programmed in accordance with this specification, can perform the process 500.

The system obtains a set of training examples for training the generator neural network (502). Each training example can include: (i) a training input to the generator neural network, and (ii) a target audio waveform that should be generated by the generator neural network by processing the training input. A training input to the generator neural network can include an input audio waveform, and optionally, conditioning data. A few examples of training inputs and corresponding target outputs are described next.

In some implementations, for one or more of the training examples, the target audio waveform is a de-noised version of the input audio waveform. The input audio waveform can be generated by adding a noise waveform to the target audio waveform. The noise waveform can be generated, e.g., in accordance with a statistical noise model, e.g., each audio sample in the noise waveform can be randomly sampled in accordance with a probability distribution. Optionally, the training input can include conditioning data that includes an accelerometer waveform, e.g., captured by an accelerometer mounted to a headphone, where the headphone further includes a microphone that captured the target audio waveform synchronously with the accelerometer waveform. Training the generator neural network on these training examples can configure the generator neural network to perform de-noising.

In some implementations, for one or more of the training examples, the target audio waveform represents a version of the input audio waveform that is captured at a higher sampling frequency than the input audio waveform. For instance, the target audio waveform can be represented at an 8 KHz sampling frequency, while the input audio waveform can be represented at a 4 KHz sampling frequency. The system can generate the input audio waveform by down-sampling the target audio waveform. Training the generator neural network on these training examples can configure the generator neural network to perform frequency bandwidth extension. In some cases, the set of training examples can include input audio waveforms represented at a range of different sampling frequencies, e.g., 2 KHz, 3 KHz, 4 KHz, and 5 KHz, while each target audio waveform can be represented at the same sampling frequency, e.g., 16 KHz. Training the generator neural network on training examples that include input audio waveforms represented at a range of sampling frequencies can enable the generator neural network to perform frequency bandwidth extension in a manner that is robust to variations in the sampling frequencies of input audio waveforms.

In some implementations, for one or more of the training examples, the input audio waveform represents an audio waveform captured using a "target" microphone, and the target audio waveform represents a version of the input audio waveform that would have been captured using a "source" microphone. The source microphone can represent a high-quality microphone with a flat frequency response that is only mildly affected by background noise and room reverberation. Training the generator neural network on these training examples can configure the generator neural network to perform microphone style transfer.

In some implementations, for one or more training examples, the input audio waveform represents speech by a person and the target audio waveform represents an anonymized version of the speech in the input audio waveform. (The speech in the target audio waveform is "anonymized," e.g., because certain characteristics of the speech in the input audio waveform, e.g., accent, pronunciation, pitch, etc., are modified in the target audio waveform). The system can generate a target audio waveform, e.g., by processing an input audio waveform using a speech recognition model to generate a transcript of the words spoken in the input audio waveform. The system can then process the transcript using a text-to-speech model that generates a waveform representing a verbalization of the text in the transcript. Training the generator neural network on these training examples configures the generator neural network to perform speech anonymization.

In some implementations, for one or more of the training examples, the input audio waveform includes audio from multiple sources, and the target audio waveform represents a filtered version of the input audio waveform that only includes audio generated by a target source. The training input can further include a conditioning audio waveform that provides an example of audio generated by the target source. To generate a training example, the system can obtain multiple audio waveforms that are each generated by a respective source, and the system can designate one of the sources as being the target source. The system can partition the audio waveform generated by the target source into a first part and a second part. Then system can designate the first part of the audio waveform generated by the target source as the target audio waveform, and designate the second part of the audio waveform generated by the target source as the conditioning waveform. The system can then generate the input audio waveform by combining (e.g., summing) the target audio waveform with at least a part of the audio waveform generated by each source other than the target source. Training the generator neural network on these training examples configures the neural network to perform conditional filtering.

For each training example, the system processes the input audio waveform from the training example to generate a corresponding output audio waveform (504). In some cases, the training example includes conditioning data, and the system jointly processes the input audio waveform and the conditioning data to generate the output audio waveform. Example techniques for generating an output audio waveform using a generator neural network are described with reference to FIG. 1-FIG. 4.

Optionally, for each training example, the system processes data derived from the output audio waveform generated for the training example using one or more discriminator neural networks (506). Each discriminator neural network is configured to process data derived from the output audio waveform to generate one or more discriminator scores. Each discriminator score characterizes an estimated likelihood that the output audio waveform was generated using the generator neural network (as opposed to being, e.g., a target audio waveform from a training example).

In some implementations, the system processes the output audio waveform using a discriminator neural network to generate one or more discriminator scores.

In some implementations, the system processes a down-sampled version of the output audio waveform using a discriminator neural network to generate one or more discriminator scores.

In some implementations, the system generates multiple down-sampled versions of the output audio waveform, where each down-sampled version is down-sampled by a respective factor. The system then processes each down-sampled version of the output audio waveform using a respective discriminator neural network to generate a respective set of discriminator scores.

In some implementations, the system applies a Fourier transform (e.g., a DFT or a STFT) to the output audio waveform, and then processes the Fourier-transformed version of the output audio waveform using a discriminator neural network to generate one or more discriminator scores.

Each discriminator neural network can have any appropriate neural network architecture which enables the discriminator neural network to perform its described functions. In particular, each discriminator neural network can include any appropriate types of neural network layers (e.g., convolutional layers, fully-connected layers, attention layers, etc.) in any appropriate number (e.g., 2 layers, 5 layers, or 10 layers) and connected in any appropriate configuration (e.g., as a linear sequence of layers).

In some implementations, the discriminator neural networks are fully convolutional neural networks (e.g., that include only convolutional neural network layers). As a result of having a fully convolutional neural network architecture, the number of discriminator scores generated by each discriminator neural network can vary proportionally with the size (e.g., length) of the input processed by the discriminator neural network. Each discriminator score generated by a discriminator neural network can be associated with a respective receptive field in the output audio waveform, and can characterize the likelihood that the portion of the output audio waveform included in the respective field was generated by the generator neural network.

For each training example, the system determines a gradient (with respect to the generator neural network parameters) of an objective function that depends on the output audio waveform for the training example, and optionally, on the discriminator scores generated for the output audio waveform (508). The system can determine the gradients, e.g., using backpropagation. The objective function can include a reconstruction loss, and optionally, an adversarial loss, e.g., the objective function $\mathcal{L}$ can be given by:

$$\mathcal{L} = \mathcal{L}_G^{rec} + \lambda \cdot \mathcal{L}_G^{adv} \qquad (1)$$

where $\mathcal{L}_G^{rec}$ is the reconstruction loss, $\mathcal{L}_G^{adv}$ is the adversarial loss, and $\lambda$ is a hyper-parameter.

For each training example, the reconstruction loss can measure an error between: (i) the output audio waveform generated for the training example, and (ii) the target audio waveform for the training example. The reconstruction loss can measure the error between an output audio waveform, e.g., using a squared-error measure, an $L_1$ measure, or an $L_2$ measure. In one example, the reconstruction loss is given by:

$$\mathcal{L}_G^{rec} = \frac{1}{K \cdot L} \sum_{k,l} \frac{\left\| D_k^{(l)}(y) - D_k^{(l)}(G(x)) \right\|}{T_{k,l}} \qquad (2)$$

where y denotes the target audio waveform, G(x) denotes the output audio waveform, k ∈ {1, . . . , K} indexes over the discriminator neural networks, $D_k^{(l)}$(y) denotes the intermediate output generated by layer l of discriminator k by processing y, $D_k^{(l)}$(G(x)) denotes the intermediate output generated by layer l of discriminator k by processing G(x), l∈ {1, . . . , L} indexes the layers of the discriminator neural networks, $T_{k,l}$ is the length of the intermediate output generated by layer l of discriminator k.

For each training example, the adversarial loss can depend on the discriminator scores generated by the discriminator neural networks for the training example. For example, the adversarial loss can be given by:

$$\mathcal{L}_G^{adv} = \frac{1}{K} \sum_{k,t} \frac{1}{T_k} \max(0, 1 - D_{k,t}(G(x))) \qquad (3)$$

where k∈ {1, . . . , K} indexes over the discriminator neural networks, t indexes over the discriminator scores, $T_k$ denotes the number of discriminator scores generated by discriminator k, and $D_{k,t}$(G(x)) denotes discriminator score t generated by discriminator k for the output audio waveform G(x).

For each training example, the system updates the parameter values of the generator neural network using the gradient generated for the training example (510). For example, the system can update the parameter values of the generator neural network by applying the gradient for the training example to the parameter values of the generator neural network using the update rule of an appropriate gradient descent optimization technique, e.g., RMSprop or Adam.

Optionally, the system updates the parameter values of the discriminator neural networks (512). More specifically, for each training example, the system can determine gradients of a discriminator objective function for the training example, and then update the parameter values of the discriminator neural networks using the gradients. The system can determine the gradients, e.g., using backpropagation, and can update the parameter values of the discriminator neural networks using the update rule of an appropriate gradient descent optimization technique, e.g., RMSprop or Adam. The discriminator objective function $\mathcal{L}_D$ can be given by:

$$\mathcal{L}_D = \frac{1}{K} \sum_{k,t} \frac{1}{T_k} \max(0, 1 - D_{k,t}(y)) + \sum_{k,t} \frac{1}{T_k} \max(0, 1 + D_{k,t}(G(x))) \qquad (4)$$

where y denotes the target audio waveform, G(x) denotes the output audio waveform, k∈ {1, . . . , K} indexes over the discriminator neural networks, t indexes over the discriminator scores, $T_k$ denotes the number of discriminator scores generated by discriminator k, $D_{k,t}$(G(x)) denotes discriminator score t generated by discriminator k for the output audio waveform G(x), and $D_{k,t}$(y) denotes discriminator score t generated by discriminator k for the target audio waveform y.

Figure 6:
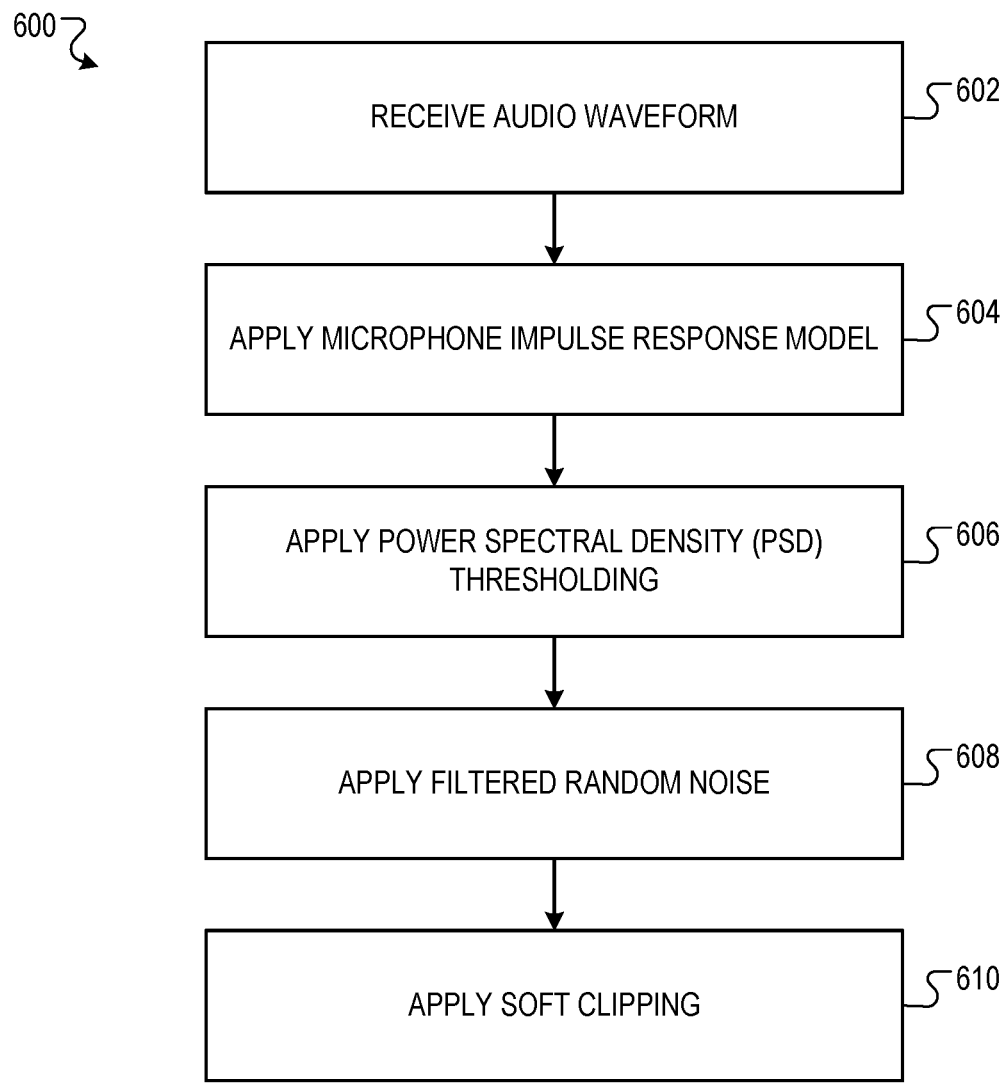
FIG. 6 is a flow diagram of an example process for mapping an input audio waveform corresponding to a source microphone to a target audio waveform corresponding to a target microphone using a microphone model.
Figure 7:
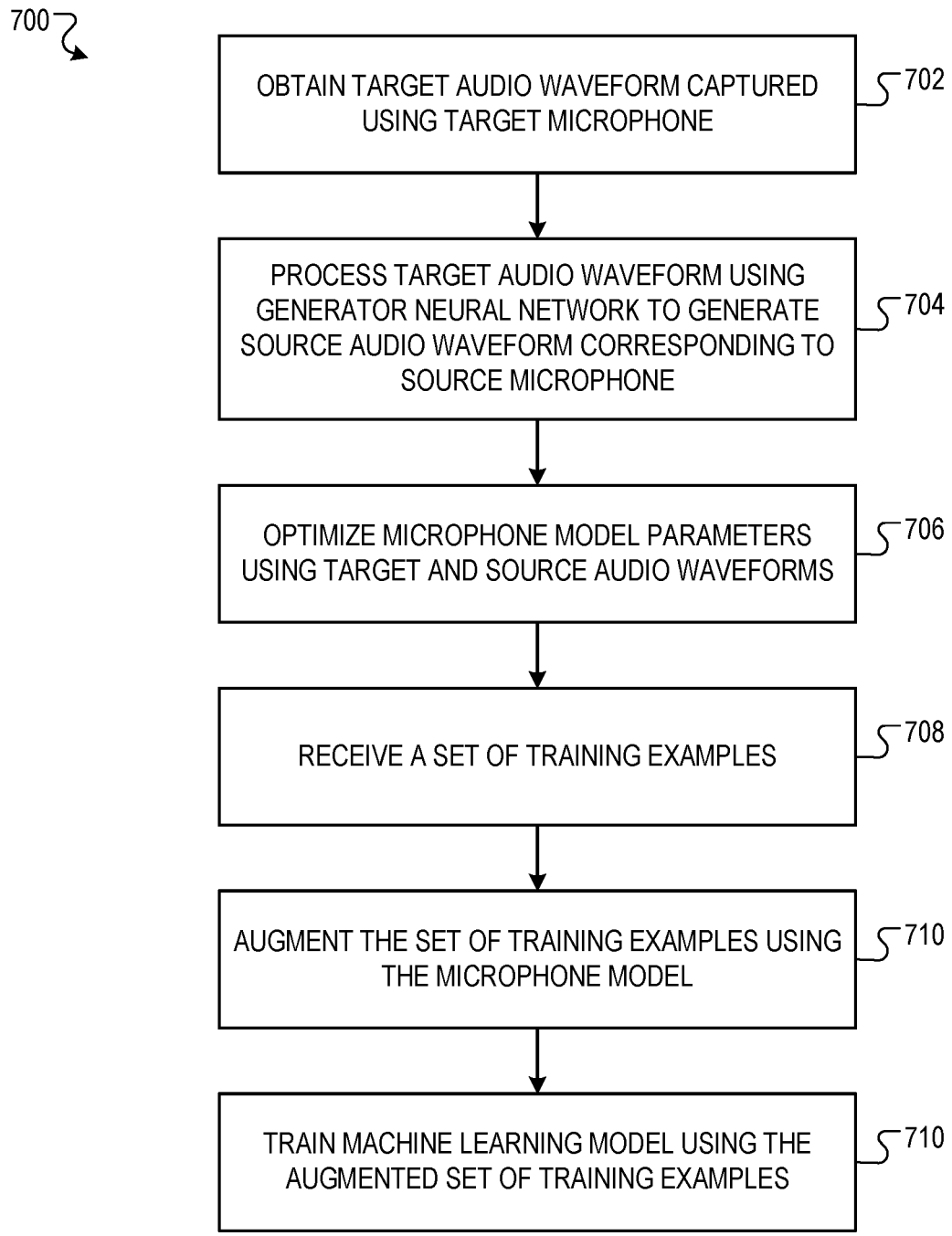
FIG. 7 is a flow diagram of an example process for optimizing the parameters of a microphone model, using the microphone model to augment a set of training examples, and using the augmented set of training examples to train a machine learning model.

FIG. 6 is a flow diagram of an example process 600 for mapping an input audio waveform corresponding to a source microphone to a target audio waveform corresponding to a target microphone using a microphone model. Given a target audio waveform from a target microphone, a set of model parameters of the microphone model can be optimized to cause the microphone model to map input audio waveforms to output waveforms corresponding to the target microphone. FIG. 7 describes an example process for optimizing the microphone model with respect to a target microphone using a generator neural network that has been trained to perform microphone style transfer. The optimized microphone model can be used to augment a set of training examples used to train a machine learning model, as will be described in more detail below.

The microphone model receives an input audio waveform corresponding to (e.g., captured by) a source microphone (602).

The microphone model updates the input audio waveform by convolving the input audio waveform with a microphone impulse response model, a room impulse response model, or both (604). The microphone impulse response model and the room impulse response model can be parameterized by a set of microphone model parameters.

The microphone model applies power spectral density (PSD) thresholding to the current audio waveform (606). For example, the microphone model can update current audio waveform y in accordance with the relationship:

$$y \leftarrow STFT^{-1}(STFT(y) \cdot \sigma(|STFT(y)|^2 - t)) \quad (5)$$

where STFT(·) denotes a short-time Fourier transform operation, σ(·) denotes the sigmoid function, and t is broadcast over time and corresponds to the STFT window length. Parameters of the STFT operation, e.g., the window length, can be included in the microphone model parameters.

The microphone model applies filtered random noise to the current audio waveform (608). For example, the microphone model can update the current audio waveform y in accordance with the relationship:

$$y \leftarrow y + f_n * \epsilon \quad (6)$$

where $f_n$ is a filter (parameterized by the microphone model parameters), $\epsilon$ is random noise sampled from a standard Normal distribution, and * denote a convolution operation.

The microphone model applies soft clipping to the current audio waveform (608). For example, the microphone model can update the current audio waveform y in accordance with the relationship:

$$y \leftarrow smoothmin(smoothmax(y, -\tau), \tau) \quad (7)$$

$$smoothmax(a, b) = \frac{ae^a + be^b}{e^a + e^b} \quad (8)$$

$$smoothmin(a, b) = \frac{ae^{-a} + be^{-b}}{e^{-a} + e^{-b}} \quad (9)$$

where the smoothmin( ) and smoothmax( ) operations are applied element-wise and i is a parameter of the microphone model.

After performing step 608, the microphone model can provide the resulting audio waveform as the target audio waveform corresponding to the target microphone.

FIG. 7 is a flow diagram of an example process 700 for optimizing the parameters of a microphone model, using the microphone model to augment a set of training examples, and using the augmented set of training examples to train a machine learning model. For convenience, the process 700 will be described as being performed by a system of one or more computers located in one or more locations.

The system obtains a target audio waveform captured using a target microphone (702).

The system processes the target audio waveform using a generator neural network to generate a source audio waveform which represents a version of the target audio waveform that would have been captured using a source microphone (704). Example techniques for training a neural network to perform microphone style transfer are described above.

The system optimizes a set of microphone model parameters using the target audio waveform and the source audio waveform (706). More specifically, the system optimizes the microphone model parameters, by gradient descent, to minimize an error between: (i) the target audio waveform, and (ii) an estimate of the target audio waveform generated by processing the source audio waveform in accordance with the set of microphone model parameters. The error can be measured using an $L_1$ error, an $L_2$ error, or any other appropriate error. Optimizing the parameters of the microphone model in this manner encourages the microphone model to map input audio waveforms to corresponding output audio waveforms that would be captured by the target microphone. That is, the microphone model parameters are optimized to learn a model of the target microphone.

The system receives a set of training examples for training a machine learning model to perform an audio processing task (708). Each training example includes an audio waveform and a target output which should be generated by the machine learning model by processing the audio waveform. The machine learning model can be configured to perform any appropriate audio processing task. For instance, the audio processing task can be a classification task, and the target output for each audio waveform can define a class of the audio waveform (e.g., human voice, car engine, dog barking, etc.). As another example, the audio processing task can be a speech recognition task, and the target output for each audio waveform can specify a sequence of words that are verbalized in the audio waveform.

The system augments the set of training examples using the microphone model (710). More specifically, for each of one or more training examples, the system processes the audio waveform from the training example using the microphone model to generate a version of the audio waveform corresponding to the target microphone. The system then generates a new training example that includes: (i) the version of the audio waveform corresponding to the target microphone, and (ii) the target output, and adds the new training example to the set of training examples.

The system trains the machine learning model on the augmented set of training examples (712). More specifically, for each training example in the augmented set of training examples, the system trains the machine learning model to process the audio waveform from the training example to generate a predicted output which matches the target output from the training example. The machine learning model can be any appropriate type of machine learning model, e.g., a neural network model, and the training technique can be any appropriate machine learning training technique, e.g., stochastic gradient descent.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, the method comprising:
   receiving an input audio waveform that comprises a respective input audio sample for each of a plurality of input time steps;
   processing the input audio waveform using an encoder neural network to generate a set of feature vectors representing the input audio waveform,
   wherein the encoder neural network comprises a sequence of encoder blocks that are each configured to:
      process a respective set of input feature vectors in accordance with a set of encoder block parameters to generate a set of output feature vectors, comprising down-sampling the set of input feature vectors; and
   processing the set of feature vectors representing the input audio waveform using a decoder neural network to generate an output audio waveform that comprises a respective output audio sample for each of a plurality of output time steps,
   wherein the decoder neural network comprises a sequence of decoder blocks that are each configured to:
      process a respective set of input feature vectors in accordance with a set of decoder block parameters to generate a set of output feature vectors, comprising up-sampling the set of input feature vectors;
   wherein the output audio waveform represents a version of the input audio waveform that has been filtered to include only audio from a target audio source; and
   wherein the encoder neural network, the decoder neural network, or both additionally process a conditioning vector representing the target audio source.

2. The method of claim 1, wherein each encoder block in the sequence of encoder blocks down-samples the set of input feature vectors to the encoder block using a respective strided convolution operation.

3. The method of claim 2, wherein for each encoder block in the sequence of encoder blocks, the strided convolution operation is a one-dimensional or two-dimensional strided convolution operation.

4. The method of claim 1, wherein for each encoder block in the sequence of encoder blocks, a dimensionality of the output feature vectors generated by the encoder block is higher than a dimensionality of the input feature vectors processed by the encoder block.

5. The method of claim 1, wherein each decoder block in the sequence of decoder blocks up-samples the set of input feature vectors to the decoder block using a respective strided transposed convolution operation.

6. The method of claim 5, wherein for each decoder block in the sequence of decoder blocks, the strided transposed convolution operation is a one-dimensional or two-dimensional strided transposed convolution operation.

7. The method of claim 1, wherein for each decoder block in the sequence of decoder blocks, a dimensionality of the output feature vectors generated by the decoder block is lower than a dimensionality of the input feature vectors processed by the decoder block.

8. The method of claim 1, wherein for each encoder block that is after a first encoder block in the sequence of encoder blocks, the set of input feature vectors to the encoder block comprises a set of output feature vectors generated by a preceding encoder block in the sequence of encoder blocks.

9. The method of claim 1, wherein for each decoder block that is after a first decoder block in the sequence of decoder blocks, the set of input feature vectors to the decoder block comprises: (i) a set of output feature vectors of a corresponding encoder block, and (ii) a set of output feature vectors generated by a preceding decoder block in the sequence of decoder blocks.

10. The method of claim 1, wherein the encoder neural network comprises a transform layer prior to the sequence of encoder blocks, wherein the transform layer maps the input audio waveform to an alternative representation in an alternative domain.

11. The method of claim 10, wherein the transform layer maps the input audio waveform to an alternative representation in a time-frequency domain.

12. The method of claim 11, wherein the transform layer implements a Fourier transform operation.

13. The method of claim 10, wherein the decoder neural network comprises an inverse transform layer after the sequence of decoder blocks, wherein the inverse transform layer maps a representation of the output audio waveform in the alternative domain to a representation of the audio waveform in a time domain.

14. The method of claim 13, wherein the inverse transform layer implements an inverse Fourier transform operation.

15. The method of claim 1, wherein the encoder neural network and the decoder neural network are jointly trained, and the training comprises:
obtaining a plurality of training examples that each include: (i) a respective input audio waveform, and (ii) a corresponding target audio waveform;
processing the respective input audio waveform from each training example using the encoder neural network followed by the decoder neural network to generate an output audio waveform that is an estimate of the corresponding target audio waveform;
determining gradients of an objective function that depends on the respective output waveform and respective target waveform for each training example; and
using the gradients of the objective function to update a set of encoder neural network parameters and a set of decoder neural network parameters.

16. The method of claim 15, wherein the training further comprises, for each training example:
processing data derived from the output audio waveform using a discriminator neural network to generate a set of one or more discriminator scores, wherein each discriminator score characterizes an estimated likelihood that the output audio waveform is an audio waveform that was generated using the encoder neural network and the decoder neural network;
wherein the objective function comprises an adversarial loss that depends on the discriminator scores generated by the discriminator neural network.

17. The method of claim 16, wherein the data derived from the output audio waveform comprises the output audio waveform, a down-sampled version of the output audio waveform, or a Fourier-transformed version of the output audio waveform.

18. The method of claim 16, wherein the training further comprises, for each training example:
generating a respective set of discriminator scores using each of a plurality of discriminator neural networks, wherein each discriminator neural network processes a respective version of the output audio waveform that has been down-sampled by a respective factor;
wherein the adversarial loss depends on the discriminator scores generated by the plurality of discriminator neural networks.

19. The method of claim 16, wherein the discriminator neural network is trained to generate discriminator scores that distinguish between: (i) output audio waveforms generated using the encoder neural network and the decoder neural network, and (ii) target audio waveforms from training examples.

20. The method of claim 16, wherein the discriminator neural network is a convolutional neural network, and wherein a number of discriminator scores in the set of discriminator scores generated by the discriminator neural network is proportional to a length of the output audio waveform.

21. The method of claim 16, wherein the objective function comprises a reconstruction loss that, for each training example, measures an error between: (i) the output audio waveform, and (ii) the corresponding target audio waveform.

22. The method of claim 21, wherein for each training example, the reconstruction loss measures a discrepancy between: (i) one or more intermediate output generated by the discriminator neural network by processing the output audio waveform, and (ii) one or more intermediate outputs generated by the discriminator neural network by processing the corresponding target audio waveform.

23. The method of claim 21, wherein the objective function comprises a linear combination of the adversarial loss and the reconstruction loss.

24. The method of claim 1, wherein each encoder block and each decoder block comprise one or more respective dilated convolutional neural network layers.

25. The method of claim 1, wherein each encoder block and each decoder block comprise one or more respective residual blocks.

26. The method of claim 1, wherein the output audio waveform is an enhanced version of the input audio waveform.

27. The method of claim 26, wherein the output audio waveform is a de-noised version of the input audio waveform.

28. The method of claim 27, wherein the encoder neural network processes both: (i) the input audio waveform, and (ii) corresponding accelerometer data.

29. The method of claim 28, wherein the accelerometer data comprises an accelerometer waveform that is captured synchronously with the input audio waveform.

30. The method of claim 29, wherein the accelerometer data comprises an accelerometer waveform captured by a bone conductance accelerometer mounted on a headphone.

31. The method of claim 26, wherein the output audio waveform represents a version of the input audio waveform captured at a higher sampling frequency than the input audio waveform.

32. The method of claim 31, wherein the encoder neural network and the decoder neural network are trained on input audio waveforms having a range of sampling frequencies.

33. The method of claim 31, wherein the input audio waveform is generated as an output of a text-to-speech model that processes an input sequence of text to generate an audio waveform that is a verbalization of the input sequence of text.

34. The method of claim 1, wherein the input audio waveform is captured using a target microphone, and the output audio waveform represents a version of the input audio waveform captured using a source microphone.

35. The method of claim 34, further comprising using the input audio waveform and the corresponding output audio waveform to optimize parameters of a target microphone model that defines a mapping from audio waveforms captured using the source microphone to audio waveforms captured using the target microphone.

36. The method of claim 35, further comprising:
processing a plurality of source audio waveforms corresponding to the source microphone using the optimized target microphone model to generate a plurality of target audio waveforms corresponding to the target microphone; and
training a machine learning model to perform an audio processing task using the target audio waveforms corresponding to the target microphone.

37. The method of claim 1, wherein the input audio waveform is a speech waveform corresponding to a verbalization by a person, and wherein the output audio waveform represents an anonymized version of the verbalization that would be generated by a text-to-speech model.

38. The method of claim 1, wherein the target audio source corresponds to a particular speaker.

39. The method of claim 1, wherein the target audio source corresponds to a particular musical instrument.

40. The method of claim 1, wherein the conditioning vector representing the target audio source is generated based on a sample audio waveform from the target audio source, wherein generating the conditioning vector comprises:
processing the sample audio waveform from the target audio source using a conditioning neural network to generate a plurality of feature vectors representing the sample audio waveform; and
generating the conditioning vector using the plurality of feature vectors representing the sample audio waveform.

41. The method of claim 40, wherein the conditioning neural network comprises a sequence of encoder blocks that are each configured to:
process a respective set of input feature vectors in accordance with a set of encoder block parameters to generate a set of output feature vectors, comprising down-sampling the set of input feature vectors.

42. The method of claim 40, wherein generating the conditioning vector using the plurality of feature vectors representing the sample audio waveform comprises:
pooling the plurality of feature vectors representing the sample audio waveform to generate a pooled feature vector;
determining a respective score for each of the plurality of feature vectors representing the sample audio waveform based on a similarity between: (i) the pooled feature vector, and (ii) the feature vector representing the sample audio waveform; and
generating the conditioning vector by combining the plurality of feature vectors representing the sample audio waveform using the scores.

43. The method of claim 1, wherein the input audio waveform is a speech or music waveform.

44. The method of claim 1, wherein the encoder neural network and the decoder neural network are implemented on a mobile device.

45. The method of claim 1, wherein the encoder neural network and the decoder neural network are implemented on a personal digital assistant device.

46. A system comprising:
one or more computers; and
one or more storage devices communicatively coupled to the one or more computers, wherein the one or more storage devices store instructions that, when executed by the one or more computers, cause the one or more computers to perform operations comprising:
receiving an input audio waveform that comprises a respective input audio sample for each of a plurality of input time steps;
processing the input audio waveform using an encoder neural network to generate a set of feature vectors representing the input audio waveform,
wherein the encoder neural network comprises a sequence of encoder blocks that are each configured to:
process a respective set of input feature vectors in accordance with a set of encoder block parameters to generate a set of output feature vectors, comprising down-sampling the set of input feature vectors; and
processing the set of feature vectors representing the input audio waveform using a decoder neural network to generate an output audio waveform that comprises a respective output audio sample for each of a plurality of output time steps,
wherein the decoder neural network comprises a sequence of decoder blocks that are each configured to:
process a respective set of input feature vectors in accordance with a set of decoder block parameters to generate a set of output feature vectors, comprising up-sampling the set of input feature vectors;
wherein the output audio waveform represents a version of the input audio waveform that has been filtered to include only audio from a target audio source; and
wherein the encoder neural network, the decoder neural network, or both additionally process a conditioning vector representing the target audio source.

47. One or more non-transitory computer storage media storing instructions that when executed by one or more computers cause the one or more computers to perform operations comprising:
receiving an input audio waveform that comprises a respective input audio sample for each of a plurality of input time steps;
processing the input audio waveform using an encoder neural network to generate a set of feature vectors representing the input audio waveform,
wherein the encoder neural network comprises a sequence of encoder blocks that are each configured to:
process a respective set of input feature vectors in accordance with a set of encoder block parameters to generate a set of output feature vectors, comprising down-sampling the set of input feature vectors; and
processing the set of feature vectors representing the input audio waveform using a decoder neural network to generate an output audio waveform that comprises a respective output audio sample for each of a plurality of output time steps,
wherein the decoder neural network comprises a sequence of decoder blocks that are each configured to:
process a respective set of input feature vectors in accordance with a set of decoder block parameters to generate a set of output feature vectors, comprising up-sampling the set of input feature vectors;
wherein the output audio waveform represents a version of the input audio waveform that has been filtered to include only audio from a target audio source; and
wherein the encoder neural network, the decoder neural network, or both additionally process a conditioning vector representing the target audio source.

* * * * *